(12) United States Patent
Yamaguchi et al.

(10) Patent No.: US 8,468,450 B2
(45) Date of Patent: Jun. 18, 2013

(54) OUTPUT CONTROL DEVICE, COMPUTER READABLE MEDIUM FOR THE SAME, AND OUTPUT CONTROL SYSTEM

(75) Inventors: Ryoji Yamaguchi, Aichi-ken (JP); Tetsuya Kato, Aichi-ken (JP); Tadahiro Kunii, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1011 days.

(21) Appl. No.: 12/335,526

(22) Filed: Dec. 15, 2008

(65) Prior Publication Data

US 2009/0153885 A1    Jun. 18, 2009

(30) Foreign Application Priority Data

Dec. 14, 2007    (JP) .................................. 2007-324066
Mar. 13, 2008    (JP) .................................. 2008-064321

(51) Int. Cl.
G06F 3/048    (2006.01)
G06F 3/00     (2006.01)

(52) U.S. Cl. ........ 715/702; 715/764; 715/771; 715/775; 715/864; 715/866; 341/176; 358/1.15

(58) Field of Classification Search .................. 715/781, 715/702, 764, 771, 775, 864, 866
See application file for complete search history.

(56) References Cited

U.S. PATENT DOCUMENTS

| | | | |
|---|---|---|---|
| 5,347,628 A |   | 9/1994 | Brewer et al. |
| 5,542,039 A | * | 7/1996 | Brinson et al. ................ 715/800 |
| 5,545,857 A | * | 8/1996 | Lee et al. .................... 178/18.03 |
| 6,040,831 A |   | 3/2000 | Nishida |
| 6,081,266 A | * | 6/2000 | Sciammarella ............... 715/727 |
| 6,292,210 B1 | * | 9/2001 | Gersberg et al. .......... 348/14.01 |
| 6,587,596 B1 |   | 7/2003 | Haeberli |
| 6,850,254 B1 | * | 2/2005 | Banning et al. ............... 715/784 |

(Continued)

FOREIGN PATENT DOCUMENTS

| | | |
|---|---|---|
| CN | 1652565 A | 8/2005 |
| JP | H03-222033 A | 10/1991 |

(Continued)

OTHER PUBLICATIONS

Japan Patent Office, Notification of Reasons for Rejection for Japanese Patent Application No. 2008-064321 (counterpart to above-captioned patent application), dispatched Jun. 8, 2010.

(Continued)

*Primary Examiner* — Steven B Theriault
(74) *Attorney, Agent, or Firm* — Baker Botts L.L.P.

(57) ABSTRACT

An output control device includes an output unit configured to output information externally received or to be transmitted outside, a display unit configured to display a predetermined image, a position detecting unit configured to detect a position specified on the predetermined image displayed on the display unit, a display control unit configured to control the display unit to display the predetermined image when the output unit outputs the information, an area specifying unit configured to specify a predetermined area on the predetermined image as an output control area for controlling an output condition of the information to be outputted from the output unit, and an output control unit configured to control the output condition of the information when the specified position on the predetermined image detected by the position detecting unit is within the output control area specified by the area specifying unit.

19 Claims, 24 Drawing Sheets

U.S. PATENT DOCUMENTS

| | | | |
|---|---|---|---|
| 7,035,865 B2 | 4/2006 | Doss et al. | |
| 7,080,324 B1* | 7/2006 | Nelson et al. | 715/771 |
| 7,284,002 B2 | 10/2007 | Doss et al. | |
| 7,664,485 B2 | 2/2010 | Twerdahl et al. | |
| 7,782,244 B2* | 8/2010 | McRae | 341/173 |
| 7,783,290 B2 | 8/2010 | Kim | |
| 8,064,902 B2 | 11/2011 | Kunii | |
| 8,089,389 B2* | 1/2012 | McRae | 341/173 |
| 8,132,110 B1 | 3/2012 | Appelman et al. | |
| 2002/0090068 A1 | 7/2002 | Song | |
| 2002/0097262 A1* | 7/2002 | Iwase et al. | 345/744 |
| 2004/0102225 A1* | 5/2004 | Furuta et al. | 455/566 |
| 2004/0171394 A1 | 9/2004 | Daita | |
| 2004/0207722 A1 | 10/2004 | Koyama et al. | |
| 2005/0120307 A1 | 6/2005 | Suzuki | |
| 2006/0004712 A1 | 1/2006 | Hakala et al. | |
| 2006/0063562 A1 | 3/2006 | Hirai | |
| 2006/0135197 A1 | 6/2006 | Jin et al. | |
| 2007/0035564 A1* | 2/2007 | Katsuyama | 345/649 |
| 2007/0083651 A1 | 4/2007 | Ishida | |
| 2008/0070553 A1 | 3/2008 | Yamakawa et al. | |
| 2008/0084576 A1* | 4/2008 | Dantwala | 358/1.15 |
| 2008/0129580 A1* | 6/2008 | McRae | 341/176 |
| 2008/0180304 A1* | 7/2008 | McRae | 341/176 |
| 2008/0180305 A1* | 7/2008 | McRae | 341/176 |
| 2008/0207231 A1* | 8/2008 | Kunii | 455/462 |
| 2009/0021761 A1* | 1/2009 | Suzuki et al. | 358/1.13 |
| 2009/0027721 A1* | 1/2009 | Misumi et al. | 358/1.15 |
| 2009/0074159 A1 | 3/2009 | Goldfarb et al. | |
| 2009/0153885 A1 | 6/2009 | Yamaguchi et al. | |
| 2009/0153903 A1* | 6/2009 | Kunii et al. | 358/1.16 |
| 2009/0154677 A1 | 6/2009 | Kunii et al. | |
| 2009/0168115 A1* | 7/2009 | Kunii | 358/444 |
| 2010/0248703 A1 | 9/2010 | Mears et al. | |
| 2011/0074700 A1 | 3/2011 | Sharp | |
| 2011/0123009 A1 | 5/2011 | Mears et al. | |
| 2011/0161856 A1 | 6/2011 | Nurmi et al. | |

FOREIGN PATENT DOCUMENTS

| | | |
|---|---|---|
| JP | H05-091179 A | 4/1993 |
| JP | H09-034392 A | 2/1997 |
| JP | H09-034483 A | 2/1997 |
| JP | H09-083630 A | 3/1997 |
| JP | 2002-232555 A | 8/2002 |
| JP | 2004-140695 A | 5/2004 |
| JP | 2004-201222 A | 7/2004 |
| JP | 2004-260657 A | 9/2004 |
| JP | 2004-304719 A | 10/2004 |
| JP | 2006-042170 A | 2/2006 |
| JP | 2006-093863 A | 4/2006 |
| JP | 2006-165821 A | 6/2006 |
| JP | 2006-222504 A | 8/2006 |
| JP | 2007-028077 A | 2/2007 |
| JP | 2007-068234 A | 3/2007 |
| JP | 2007-201906 A | 8/2007 |
| JP | 2009-147566 A | 7/2009 |

OTHER PUBLICATIONS

The State Intellectual Property Office of the People'S Republic of China, Notification of First Office Action for Chinese Patent Application No. 200810186729.7 (counterpart to above-captioned patent application), issued Aug. 5, 2010.

United States Patent and Trademark Office, Notice of Allowance and Fee(s) Due for U.S. Appl. No. 12/337,364, mailed Sep. 11, 2012.

* cited by examiner

| CONTROLLED MATTERS | FIRST METHOD (PRECONDITION: $|y2-y1| \leq |x2-x1|$) | (OPERATION MANNERS) | SECOND METHOD (PRECONDITION: $|y2-y1| > |x2-x1|$) | (OPERATION MANNERS) |
|---|---|---|---|---|
| TRANSMITTED VOICE VOLUME: UP | $(Xa \leq X1 \leq (Xa+Xb)/2, Ya \leq Y1 \leq Yb)$ → $((Xa+Xb)/2<X2 \leq Xb, Ya \leq Y2 \leq Yb)$ | FROM LEFT TO RIGHT | $(Xa \leq X1 \leq Xb, (Xa+Xb)/2<Y1 \leq Yb)$ → $(Xa \leq X2 \leq Xb, Ya \leq Y2 \leq (Ya+Yb)/2)$ | FROM DOWNSIDE TO UPSIDE |
| TRANSMITTED VOICE VOLUME: DOWN | $((Xa+Xb)/2<X1 \leq Xb, Ya \leq Y1 \leq Yb)$ → $(Xa \leq X2 \leq (Xa+Xb)/2, Ya \leq Y2 \leq Yb)$ | FROM RIGHT TO LEFT | $(Xa \leq X1 \leq Xb, Ya \leq Y1 \leq (Ya+Yb)/2)$ → $(Xa \leq X2 \leq Xb, (Xa+Yb)/2<Y2 \leq Yb)$ | FROM UPSIDE TO DOWNSIDE |
| RECEIVED VOICE VOLUME: UP | $(Xc \leq X1 \leq (Xc+Xd)/2, Yc \leq Y1 \leq Yd)$ → $((Xc+Xd)/2<X2 \leq Xd, Yc \leq Y2 \leq Yd)$ | FROM LEFT TO RIGHT | $(Xc \leq X1 \leq Xd, (Yc+Yd)/2<Y1 \leq Yd)$ → $(Xc \leq X2 \leq Xd, Yc \leq Y2 \leq (Yc+Yd)/2)$ | FROM DOWNSIDE TO UPSIDE |
| RECEIVED VOICE VOLUME: DOWN | $((Xc+Xd)/2<X1 \leq Xd, Yc \leq Y1 \leq Yd)$ → $(Xc \leq X2 \leq (Xc+Xd)/2, Yc \leq Y2 \leq Yd)$ | FROM RIGHT TO LEFT | $(Xc \leq X1 \leq Xd, Yc \leq Y1 \leq (Yc+Yd)/2)$ → $(Xc \leq X2 \leq Xd, (Yc+Yd)/2<Y2 \leq Yd)$ | FROM UPSIDE TO DOWNSIDE |

| CONTROLLED MATTER | FIRST METHOD (PRECONDITION: $|y1-y2| \leq |x1-x2|$) | (OPERATION MANNER) | SECOND METHOD (PRECONDITION: $|y2-y1|>|x2-x1|$) | (OPERATION MANNER) | THIRD METHOD | (OPERATION MANNER) |
|---|---|---|---|---|---|---|
| MUTE | $(Xa \leq X1 \leq Xb, Ya \leq Y1 \leq (Xa+Yb)/2)$ → $(Xa \leq X2 \leq Xb, (Ya+Yb)/2<Y2 \leq Yb)$ OR $(Xc \leq X1 \leq Xd, Yc \leq Y1 \leq (Yc+Yd)/2)$ → $(Xc \leq X2 \leq Xd, (Yc+Yd)/2<Y2 \leq Yd)$ | FROM UPSIDE TO DOWNSIDE | $(Xa \leq X1 \leq (Xa+Xb)/2, Ya \leq Y1 \leq Yb)$ → $((Xa+Xb)/2<X2 \leq Xb, Ya \leq Y2 \leq Yb)$ OR $(Xc \leq X1 \leq (Xc+Xd)/2, Yc \leq Y1 \leq Yd)$ → $((Xc+Xd)/2<X2 \leq Xd, Yc \leq Y2 \leq Yd)$ | FROM LEFT TO RIGHT | $(Xa \leq X1 \leq Xb, Ya \leq Y1 \leq Yb)$ OR $(Xc \leq X1 \leq Xd, Yc \leq Y1 \leq Yd)$ | LONG PRESSING FOR 1.5 SECONDS |

| NAME | | | A |
|---|---|---|---|
| TELEPHONE NUMBER | | | 090-AAAA-AAAA |
| IMAGE FILE NAME | | | AAA |
| IMAGE TYPE | | | FACE : PARTY IN COMMUNICATION |
| EAR | CONTROLLED SUBJECT | | SOUND VOLUME OF TRANSMITTED VOICE |
| | COORDINATES OF AREA | Xa | 10 |
| | | Xb | 20 |
| | | Ya | 40 |
| | | Yb | 60 |
| | OPERATION METHOD | | SECOND METHOD |
| | CURRENT SOUND VOLUME | | 5 |
| MOUTH | CONTROLLED SUBJECT | | SOUND VOLUME OF RECEIVED VOICE |
| | COORDINATES OF AREA | Xc | 30 |
| | | Xd | 50 |
| | | Yc | 55 |
| | | Yd | 65 |
| | OPERATION METHOD | | FIRST METHOD |
| | CURRENT SOUND VOLUME | | 6 |
| MUTE | AREA | | MOUTH |
| | OPERATION METHOD | | THIRD METHOD |
| | HOLD SOUND | | DEFAULT |
| | HOLD SOUND VOLUME | | 5 |

FIG. 4

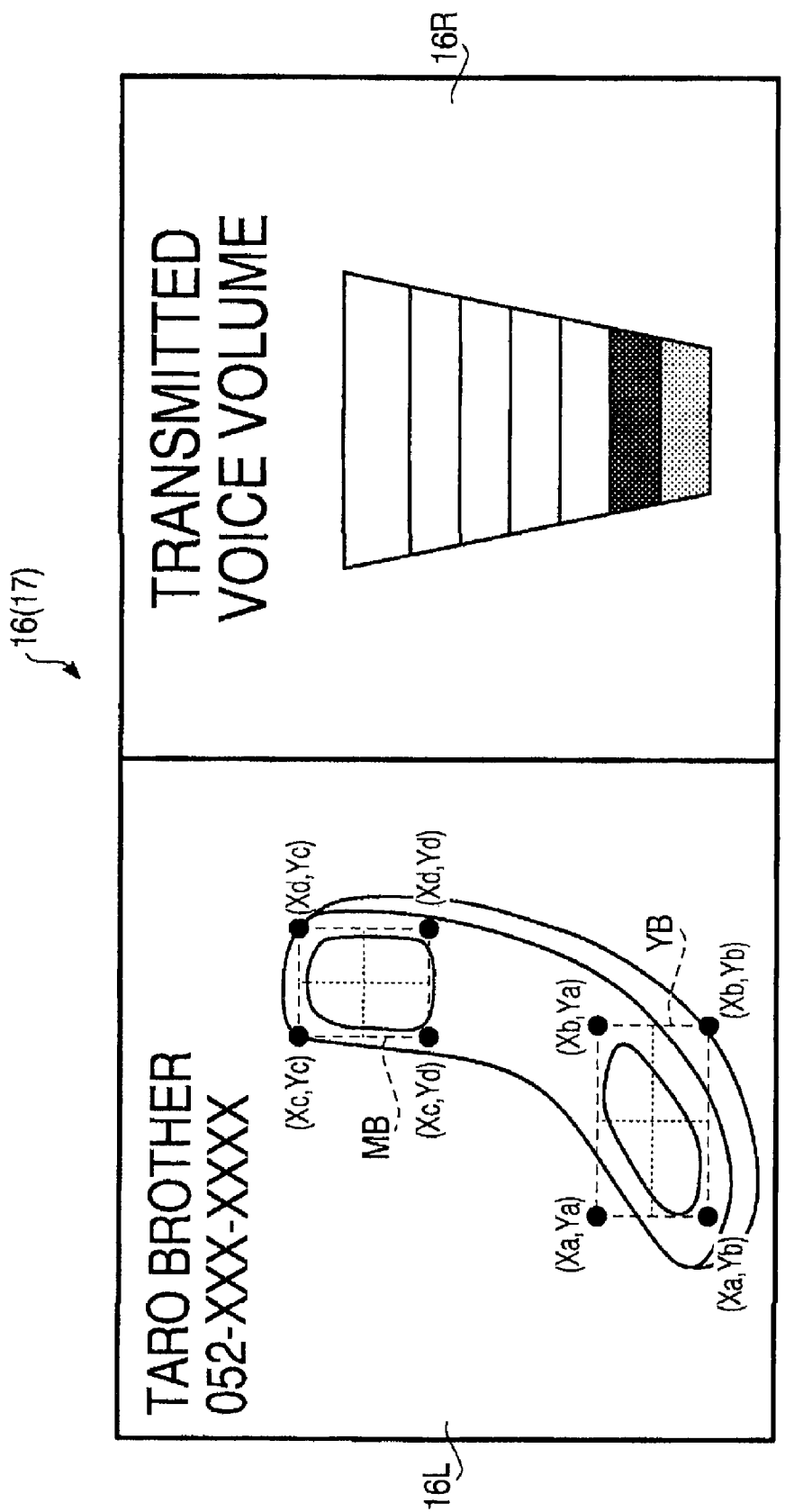

FIG.6B

FIRST METHOD

| CONTROLLED MATTERS | (PRECONDITION: $|y2-y1| \leq |x2-x1|$) | (OPERATION MANNERS) |
|---|---|---|
| ENLARGEMENT OF IMAGE | $(Xa \leq X1 \leq (Xa+Xb)/2, Ya \leq Y1 \leq Yb)$ → $((Xa+Xb)/2 < X2 \leq Xb, Ya \leq Y2 \leq Yb)$ | FROM LEFT TO RIGHT |
| REDUCTION OF IMAGE | $((Xa+Xb)/2 < X1 \leq Xb, Ya \leq Y1 \leq Yb)$ → $(Xa \leq X2 \leq (Xa+Xb)/2, Ya \leq Y2 \leq Yb)$ | FROM RIGHT TO LEFT |

SECOND METHOD

| | (PRECONDITION: $|y2-y1| > |x2-x1|$) | (OPERATION MANNERS) |
|---|---|---|
| | $(Xa \leq X1 \leq Xb, (Ya+Yb)/2 < Y1 \leq Yb)$ → $(Xa \leq X2 \leq Xb, Ya \leq Y2 \leq (Ya+Yb)/2)$ | FROM DOWNSIDE TO UPSIDE |
| | $(Xa \leq X1 \leq Xb, Ya \leq Y1 \leq (Ya+Yb)/2)$ → $(Xa \leq X2 \leq Xb, (Ya+Yb)/2 < Y2 \leq Yb)$ | FROM UPSIDE TO DOWNSIDE |

FIG.6C

FIRST METHOD

| CONTROLLED MATTERS | (PRECONDITION: $|y2-y1| \leq |x2-x1|$) | (OPERATION MANNERS) | (PRECONDITION: $|y2-y1| > |x2-x1|$) | (OPERATION MANNERS) |
|---|---|---|---|---|
| SCROLL RIGHT | $(Xc \leq X1 \leq (Xc+Xd)/2, Yc \leq Y1 \leq Yd)$ → $((Xc+Xd)/2 < X2 \leq Xd, Yc \leq Y2 \leq Yd)$ | FROM LEFT TO RIGHT | | |
| SCROLL LEFT | $((Xc+Xd)/2 < X1 \leq Xd, Yc \leq Y1 \leq Yd)$ → $(Xc \leq X2 \leq (Xc+Xd)/2, Yc \leq Y2 \leq Yd)$ | FROM RIGHT TO LEFT | | |
| SCROLL UP | | | $(Xc \leq X1 \leq Xd, (Xc+Xd)/2 < Y1 \leq Yd)$ → $(Xc \leq X2 \leq Xd, Yc \leq Y2 \leq (Yc+Yd)/2)$ | FROM DOWNSIDE TO UPSIDE |
| SCROLL DOWN | | | $(Xc \leq X1 \leq Xd, Yc \leq Y1 \leq (Yc+Yd)/2)$ → $(Xc \leq X2 \leq Xd, (Yc+Yd)/2 < Y2 \leq Yd)$ | FROM UPSIDE TO DOWNSIDE |

12c

| FACSIMILE NUMBER | | | 052-xxx-xxxx |
|---|---|---|---|
| IMAGE TYPE | | | FACE : PARTY OTHER THAN USER |
| RIGHT EYE | CONTROLLED SUBJECT | | SCALING |
| | COORDINATES OF AREA | Xa | 20 |
| | | Xb | 40 |
| | | Ya | 40 |
| | | Yb | 60 |
| | OPERATION METHOD | | SECOND METHOD |
| | SCALING RATIO | | 10 |
| LEFT EYE | CONTROLLED SUBJECT | | SCROLL |
| | COORDINATES OF AREA | Xc | 50 |
| | | Xd | 70 |
| | | Yc | 40 |
| | | Yd | 60 |
| | OPERATION METHOD | | FIRST METHOD |
| | SCROLL AMOUNT | | 5 |

FIG. 7

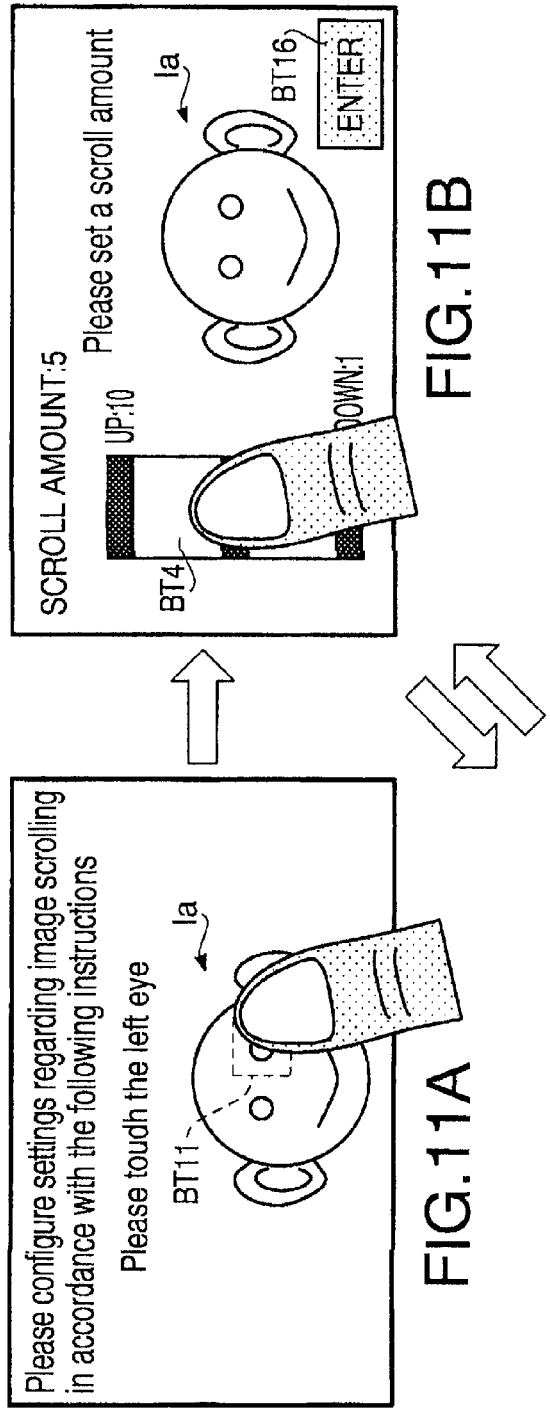

OUTPUT CONTROL DEVICE, COMPUTER READABLE MEDIUM FOR THE SAME, AND OUTPUT CONTROL SYSTEM

CROSS-REFERENCE TO RELATED APPLICATION

This application claims priority under 35 U.S.C. §119 from Japanese Patent Applications No. 2007-324066 filed on Dec. 14, 2007 and No. 2008-064321 filed on Mar. 13, 2008. The entire subject matters of the applications are incorporated herein by reference.

BACKGROUND

1. Technical Field

The following description relates to one or more techniques for controlling an output condition of information to be outputted from a device such as a sound and an image.

2. Related Art

A device configured to control a sound volume with a touch panel has been known. For example, Japanese Patent Provisional Publication No. 2006-42170 (hereinafter, simply referred to as '170 Publication) discloses a reproducing device that includes a display unit provided with a touch panel. The display unit displays, as a screen for controlling a sound volume of music, an object having a plurality of bars radially disposed each of which includes two or more spots linearly aligned. When operating the touch panel as drawing a circle clockwise or counterclockwise thereon, a user can control the sound volume.

SUMMARY

However, since the reproducing device disclosed in '170 Publication displays a geometric pattern as a sound volume control screen, user preference is not reflected on the design of the screen. Thus, there are some problems with the known reproducing device, such as a problem that the user cannot intuitively control the sound volume and a problem that it is hard for the user to intuitively understand what is controlled on the screen.

Aspects of the present invention are advantageous to provide one or more output control devices, computer readable media for the same, and output control systems that allow a user to intuitively control an output condition of information to be outputted such as a sound and an image.

According to aspects of the present invention, an output control device is provided, which includes an output unit configured to output information externally received or to be transmitted outside, a display unit configured to display a predetermined image, a position detecting unit configured to detect a position specified on the predetermined image displayed on the display unit, a display control unit configured to control the display unit to display the predetermined image when the output unit outputs the information, an area specifying unit configured to specify a predetermined area on the predetermined image as an output control area for controlling an output condition of the information to be outputted from the output unit, depending on what kind of image the predetermined image is, and an output control unit configured to control the output condition of the information when the specified position on the predetermined image detected by the position detecting unit is within the output control area specified by the area specifying unit.

In some aspects, the display control unit controls the display unit to display a predetermined image when the output unit outputs the information. Then, the area specifying unit assigns a predetermined area on the predetermined image to the output control area depending on what kind of image the predetermined image is. Further, the output control unit controls an output condition of the information to be outputted from the output unit, when the specified position on the predetermined image detected by the position detecting unit is within the output control area specified by the area specifying unit. Thus, since the output control area is specified depending on what kind of image the predetermined image is, the user can intuitively an output condition of the information with the predetermined image displayed on the display unit.

According to aspects of the present invention, further provided is an output control device that includes a communication unit configured to perform communication with an external device therethrough, an output unit configured to output a voice received from the external device and a voice to be transmitted, a display unit configured to display a predetermined image, a position detecting unit configured to detect a position specified on the predetermined image displayed on the display unit, a display control unit configured to control the display unit to display an image of a handset as the predetermined image when the communication is performed with the external device via the communication unit, an area specifying unit configured to specify an area corresponding to a voice receiving portion on the image of the handset as a received voice volume control area for controlling a sound volume of the received voice and to specify an area corresponding to a voice transmitting portion on the image of the handset as a transmitted voice volume control area for controlling a sound volume of the transmitted voice, and an output control unit configured to control the sound volume of the received voice when the specified position detected on the image of the handset by the position detecting unit is within the received voice volume control area specified by the area specifying unit and to control the sound volume of the transmitted voice when the specified position detected on the image of the handset by the position detecting unit is within the transmitted voice volume control area specified by the area specifying unit.

In some aspects, when the specified position detected on the image of the handset is within the received voice volume control area specified by the area specifying unit, the output control unit controls the sound volume of the received voice. Further, when the specified position detected on the image of the handset is within the transmitted voice volume control area specified by the area specifying unit, the output control unit controls the sound volume of the transmitted voice. For the user, the "voice receiving portion" and the "voice transmitting portion" can easily be associated with the "received voice" and the "transmitted voice," respectively. Accordingly, the user can intuitively control the sound volumes of the received voice and the transmitted voice in the communication with the image of the handset.

According to aspects of the present invention, further provided is a computer readable medium having computer readable instructions to be executed by an output control device that includes an output unit configured to output information externally received or to be transmitted outside, a display unit configured to display a predetermined image, and a position detecting unit configured to detect a position specified on the predetermined image displayed on the display unit. The instructions cause the output control device to perform a display control step of controlling the display unit to display the predetermined image when the output unit outputs the information, an area specifying step of specifying a predetermined area on the predetermined image as an output control area for controlling an output condition of the information to be outputted from the output unit, depending on what kind of image the predetermined image is, and an output control step of controlling the output condition of the information when the specified position on the predetermined image detected by the position detecting unit is within the output control area specified in the area specifying step.

According to the computer readable medium adopted as above, the same effects as the aforementioned output control devices can be provided.

According to aspects of the present invention, further provided is an output control system, which includes an output unit configured to output information externally received or to be transmitted outside, a display unit configured to display a predetermined image, a position detecting unit configured to detect a position specified on the predetermined image displayed on the display unit, a display control unit configured to control the display unit to display the predetermined image when the output unit outputs the information, an area specifying unit configured to specify a predetermined area on the predetermined image as an output control area for controlling an output condition of the information to be outputted from the output unit, depending on what kind of image the predetermined image is, and an output control unit configured to control the output condition of the information when the specified position on the predetermined image detected by the position detecting unit is within the output control area specified by the area specifying unit.

According to the output control system adopted as above, the same effects as the aforementioned output control devices can be provided.

BRIEF DESCRIPTION OF THE
ACCOMPANYING DRAWINGS

FIG. 3B is a table showing conditions of finger operations for controlling a sound volume of a transmitted voice and a sound volume of a received voice, and configuring or canceling a mute setting in the first embodiment according to one or more aspects of the present invention.

FIG. 4 exemplifies data stored on a telephone directory memory in the first embodiment according to one or more aspects of the present invention.

FIG. 5 exemplifies a sound volume control screen of the MFP in the first embodiment according to one or more aspects of the present invention.

Figure 6A:
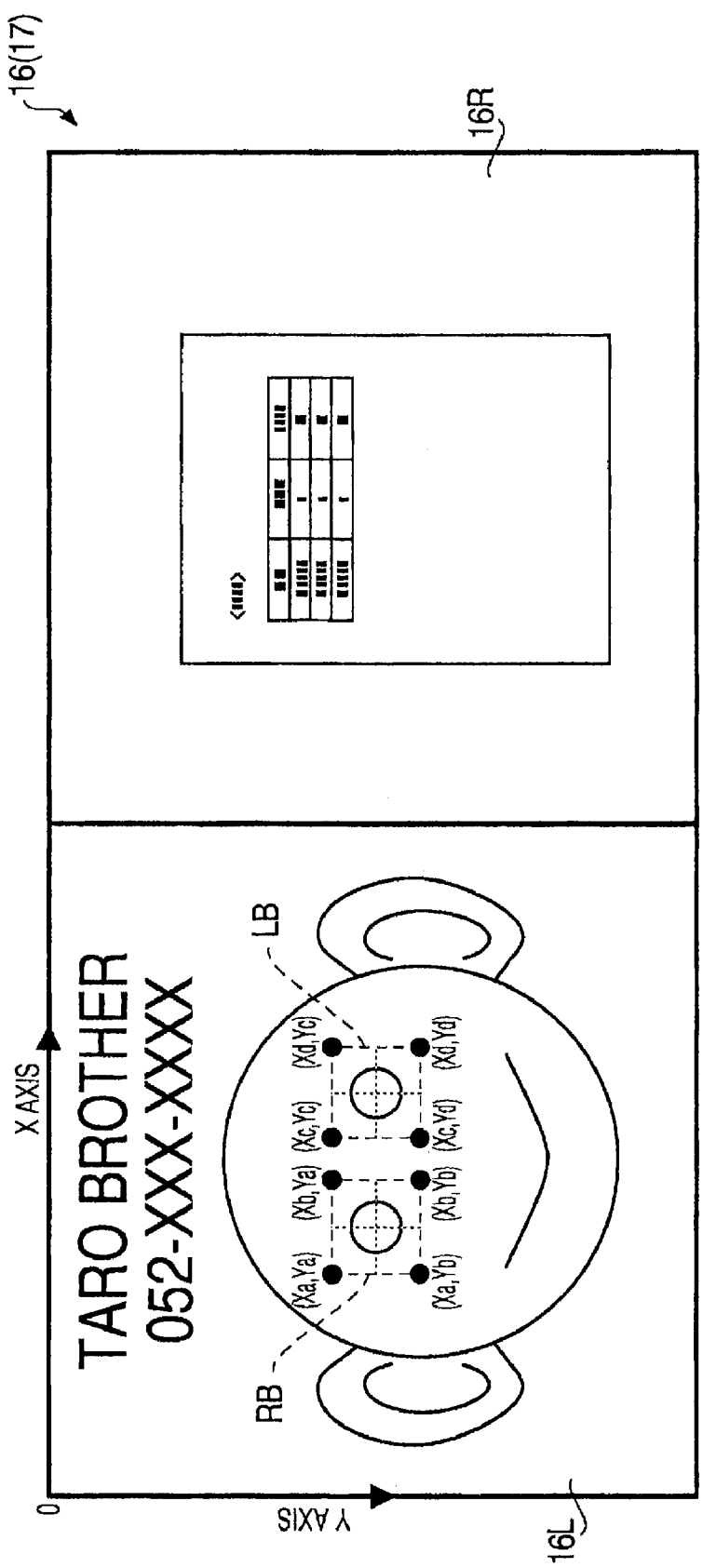
Figure 8B:
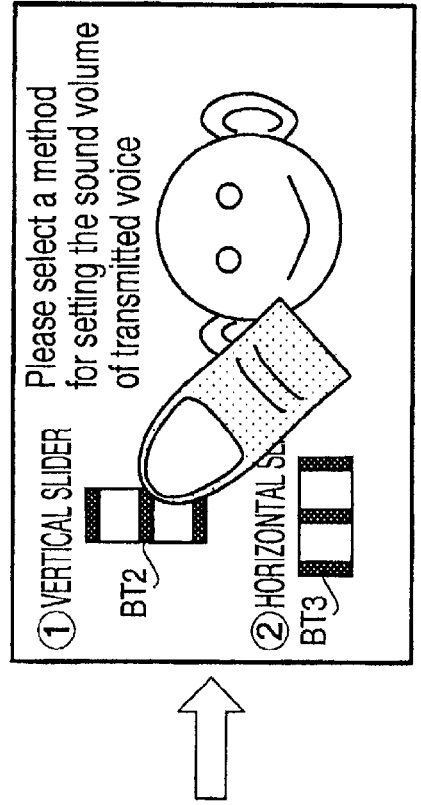
Figure 8D:
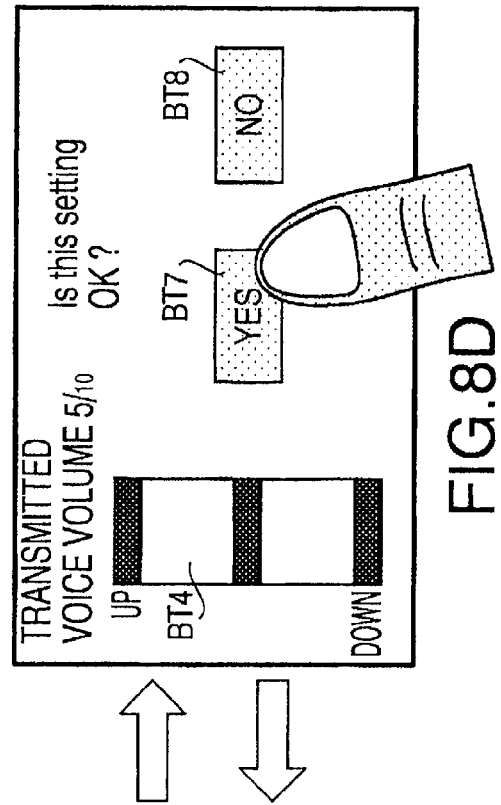
Figure 8A:
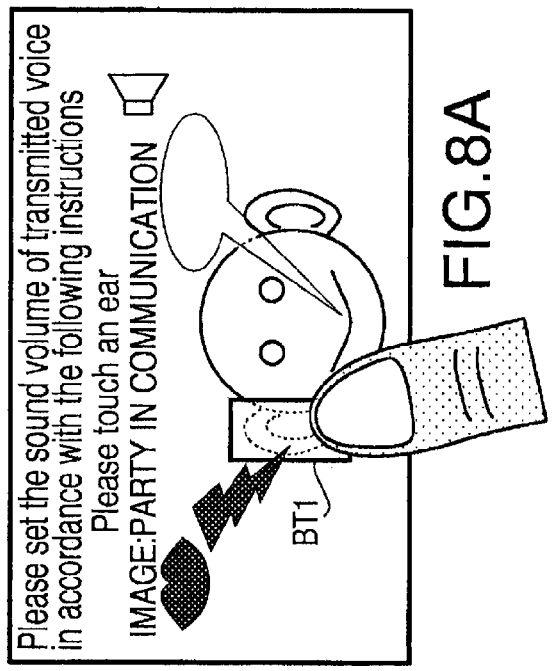
Figure 8C:
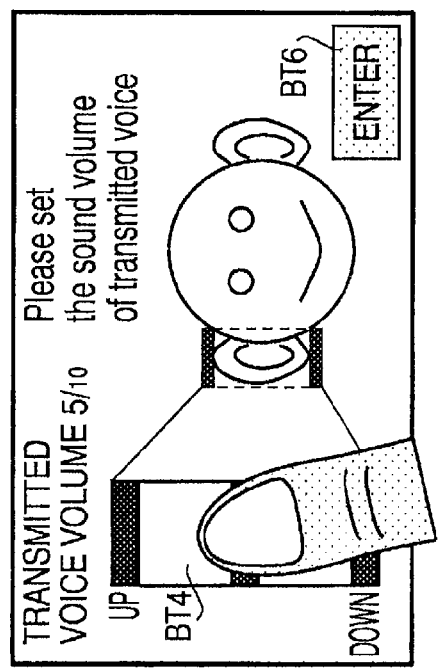
Figure 9A:
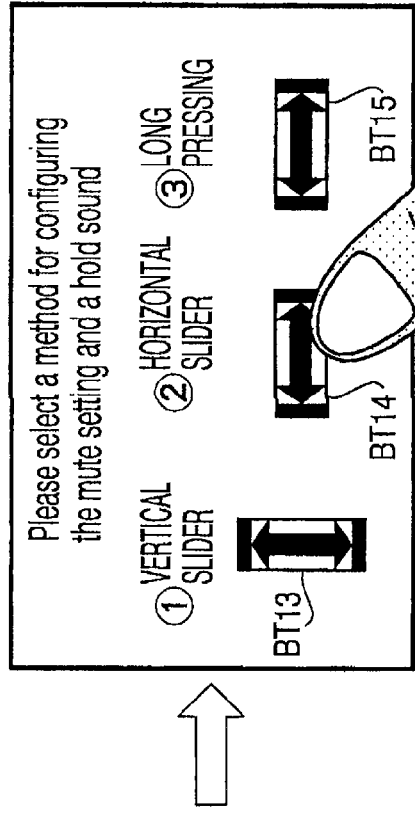
Figure 9B:
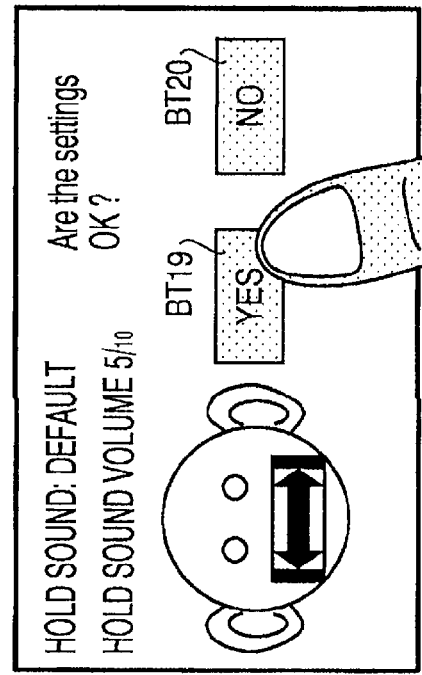
Figure 9C:
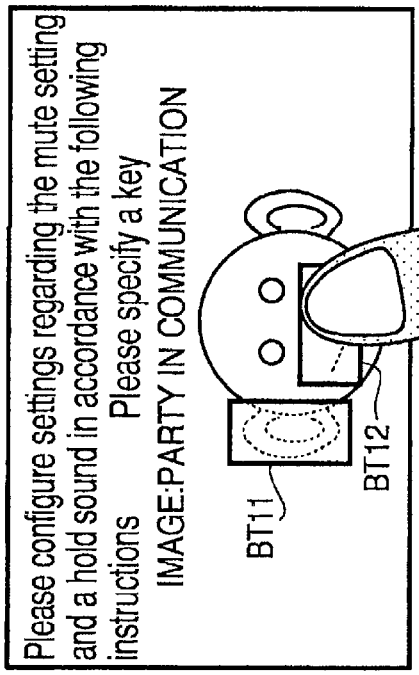
Figure 9D:
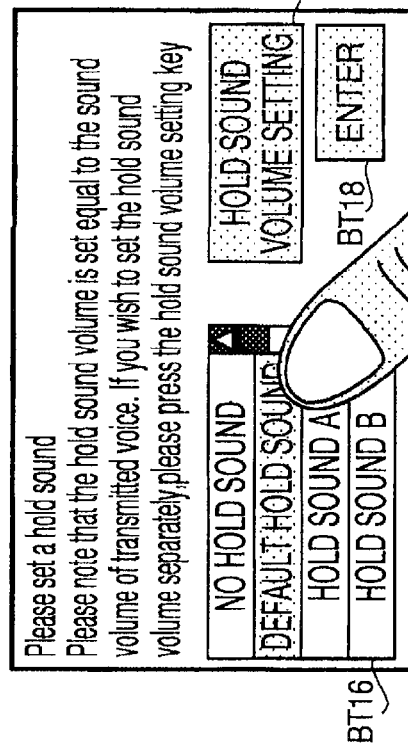
Figure 10A:
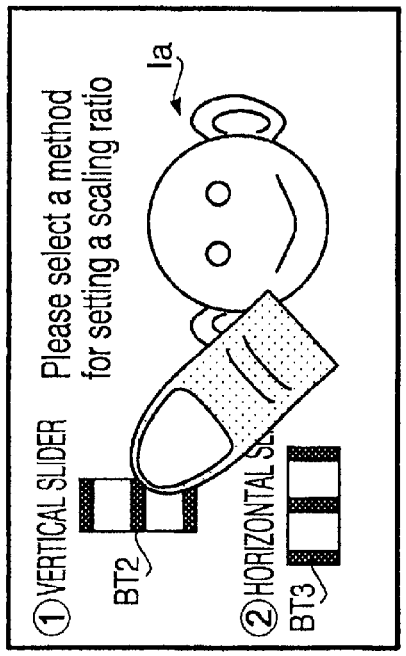
Figure 10B:
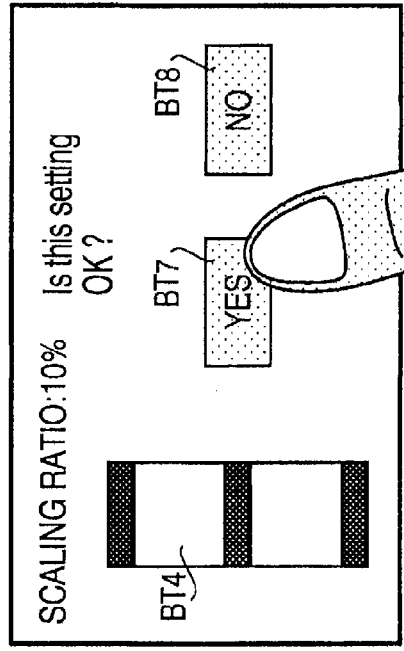
Figure 10C:
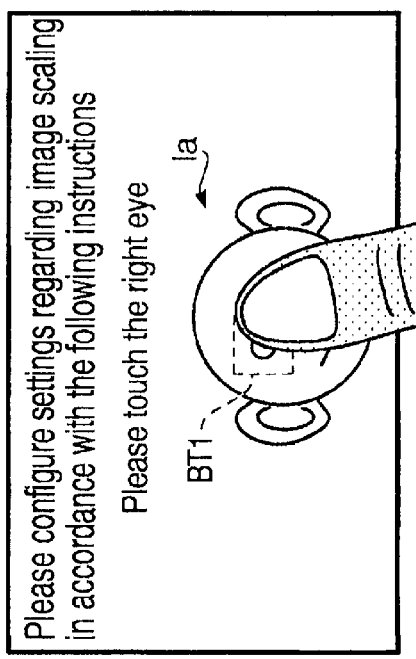
Figure 10D:
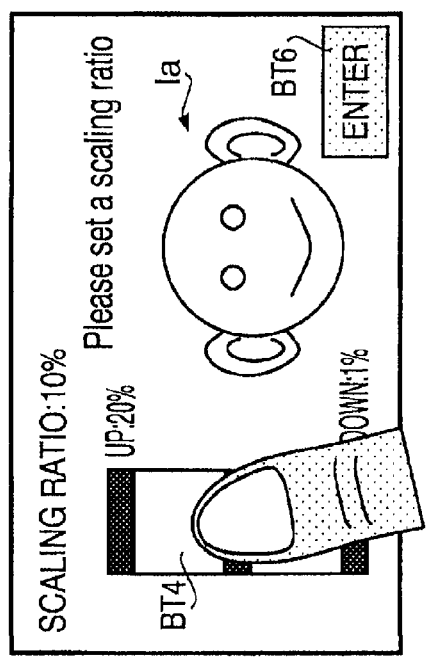

FIG. 6A is a schematic diagram exemplifying an image control screen in the first embodiment according to one or more aspects of the present invention.

FIG. 6B is a table showing conditions of finger operations with respect to a right eye area on the image control screen in the first embodiment according to one or more aspects of the present invention.

FIG. 6C is a table showing conditions of finger operations with respect to a left eye area on the image control screen in the first embodiment according to one or more aspects of the present invention.

FIG. 7 exemplifies data stored on the telephone directory memory in the first embodiment according to one or more aspects of the present invention.

FIGS. 8A to 8D are schematic diagrams exemplifying registration screens to illustrate a procedure of registering a setting for controlling the sound volume of the transmitted voice in the first embodiment according to one or more aspects of the present invention.

FIGS. 9A to 9D are schematic diagrams exemplifying registration screens to illustrate a procedure of registering a mute setting in the first embodiment according to one or more aspects of the present invention.

FIGS. 10A to 10D are schematic diagrams exemplifying registration screens to illustrate a procedure of registering a setting for image scaling according to one or more aspects of the present invention.

FIGS. 11A to 11C are schematic diagrams exemplifying registration screens to illustrate a procedure of registering a setting for image scroll according to one or more aspects of the present invention.

Figure 12:
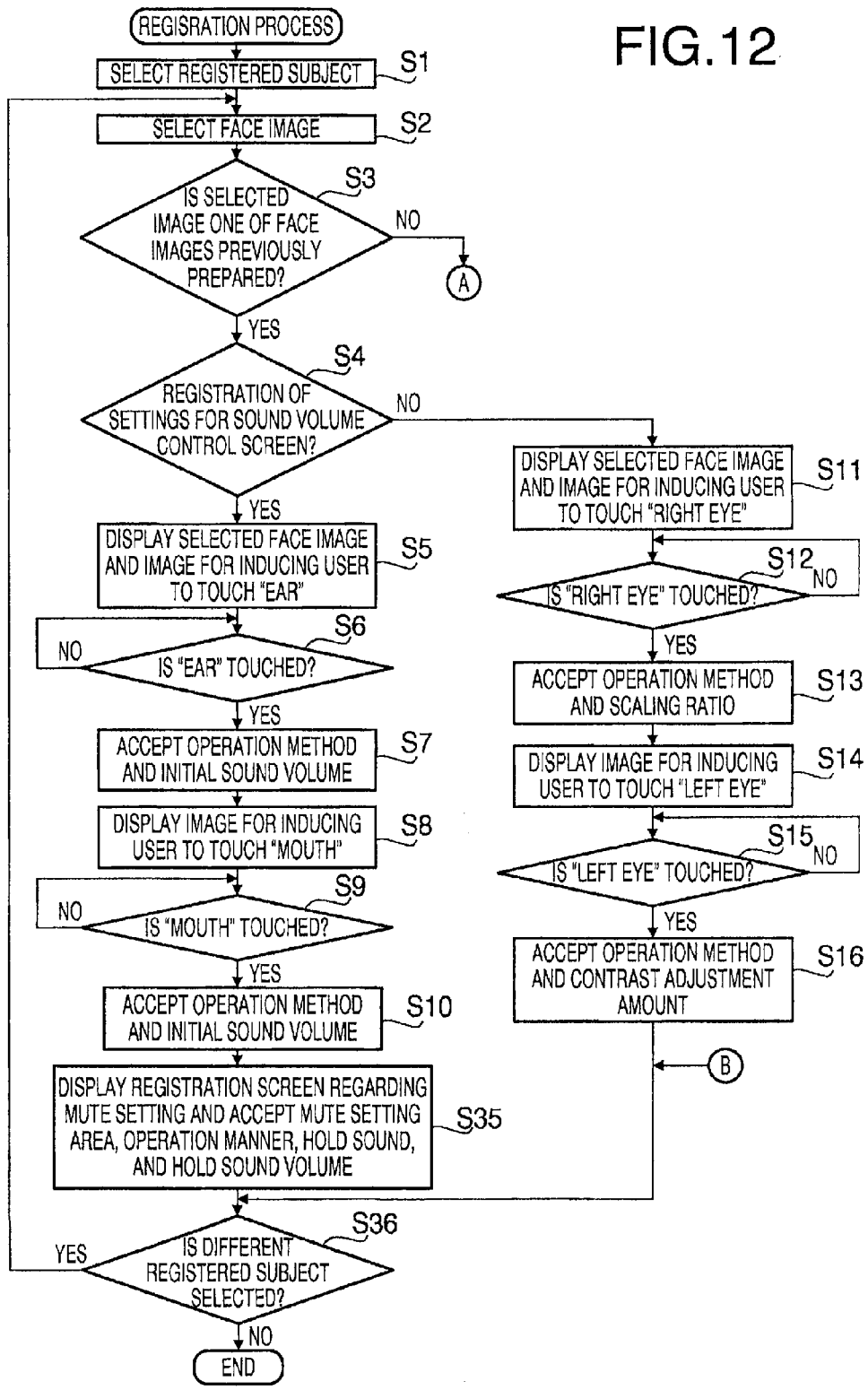
Figure 13:
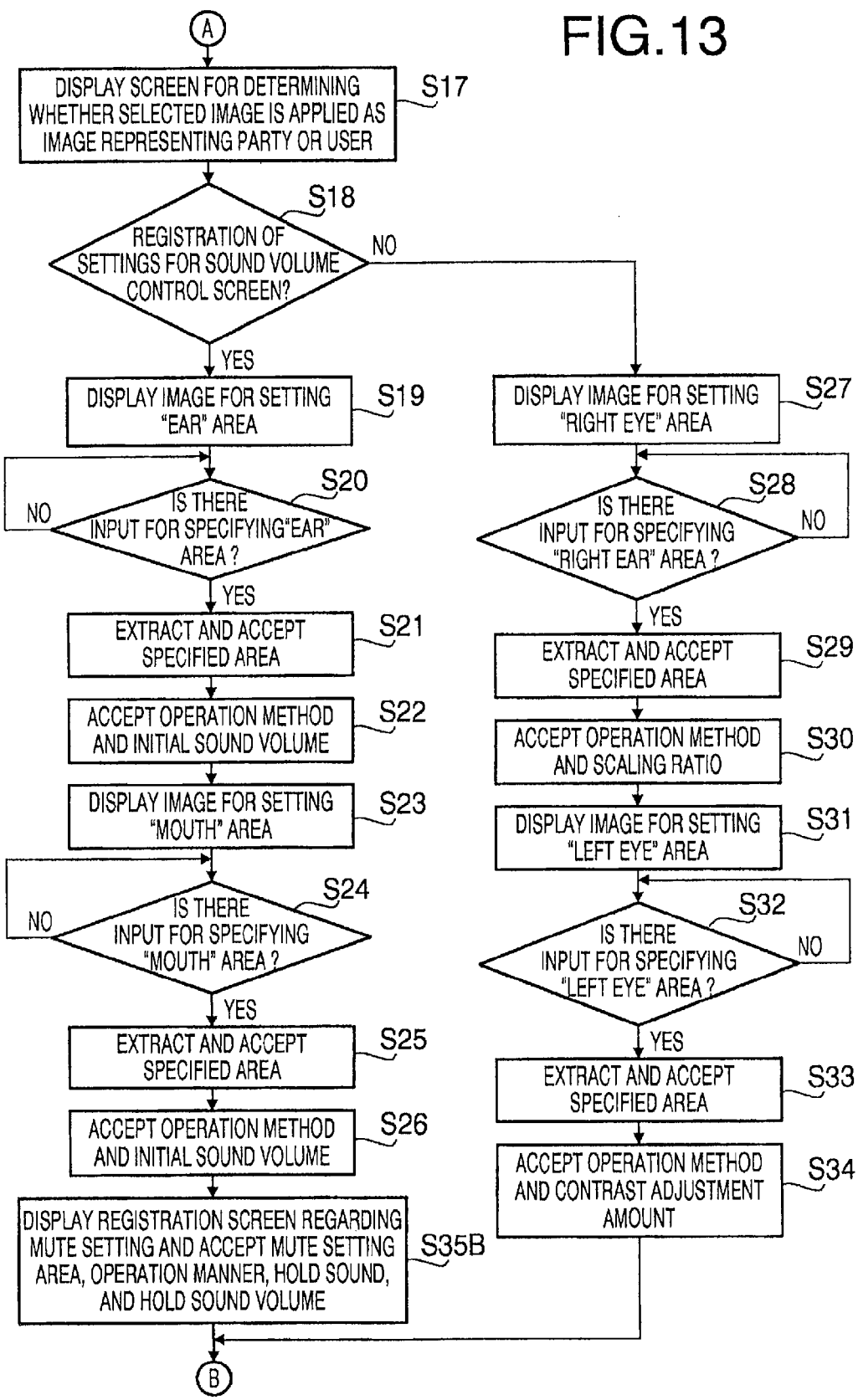

FIGS. 12 and 13 are flowcharts showing a procedure of a registration process in the first embodiment according to one or more aspects of the present invention.

Figure 14:
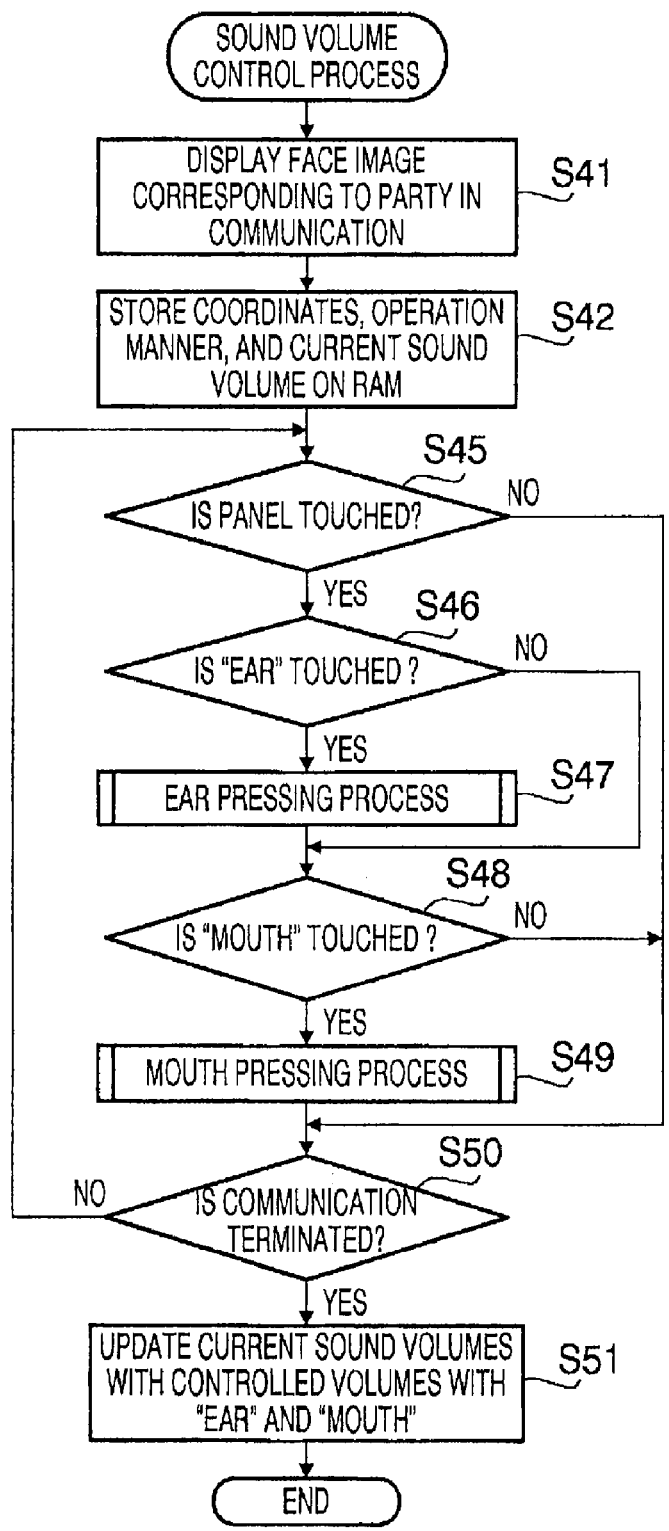

FIG. 14 is a flowchart showing a procedure of a sound volume control process in the first embodiment according to one or more aspects of the present invention.

Figure 15A:
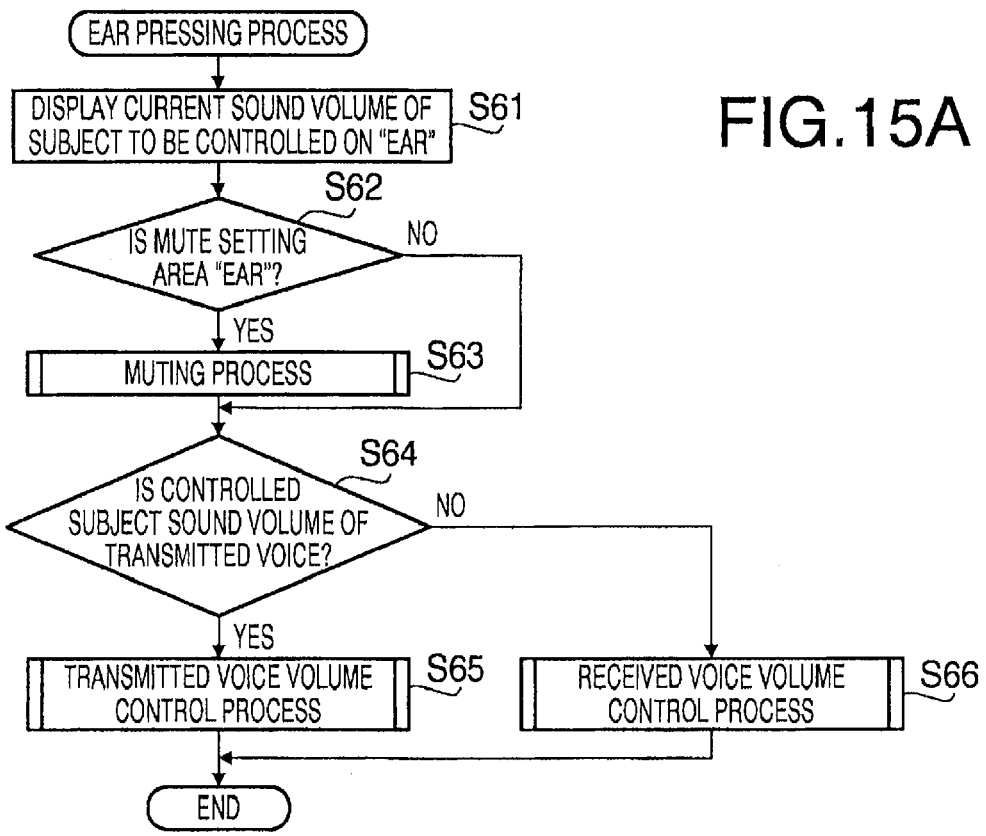

FIG. 15A is a flowchart showing a procedure of an ear pressing process in the first embodiment according to one or more aspects of the present invention.

Figure 15B:
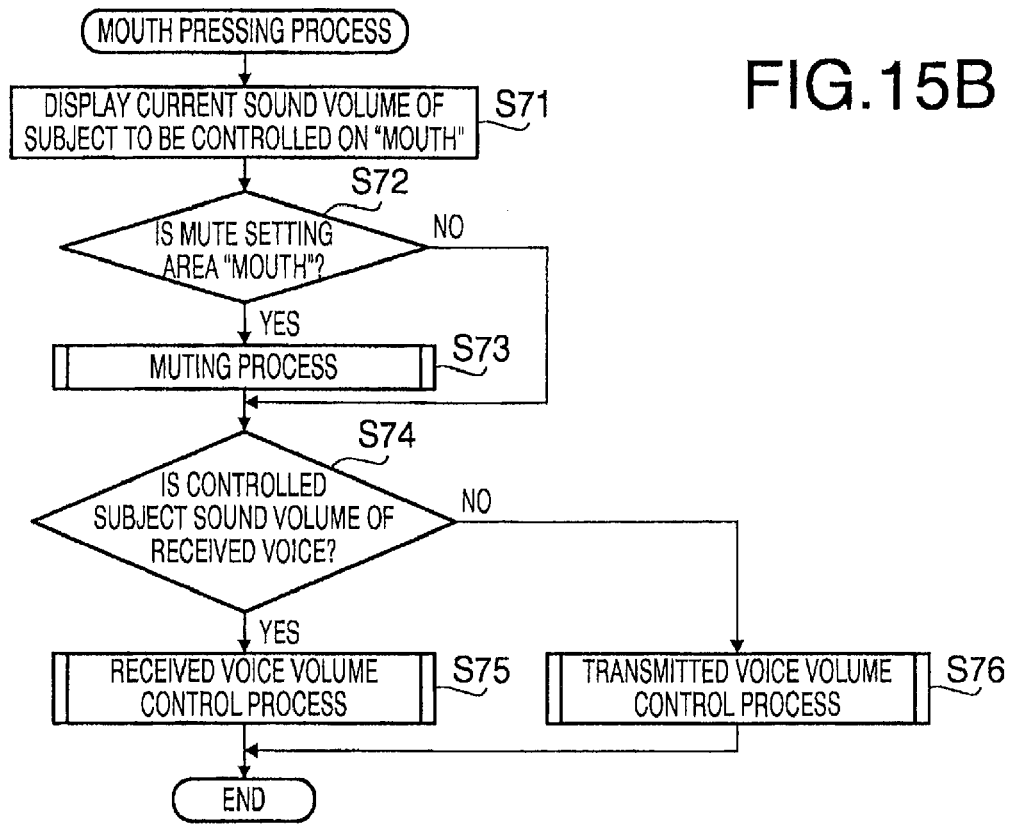

FIG. 15B is a flowchart showing a procedure of a mouth pressing process in the first embodiment according to one or more aspects of the present invention.

Figure 16:
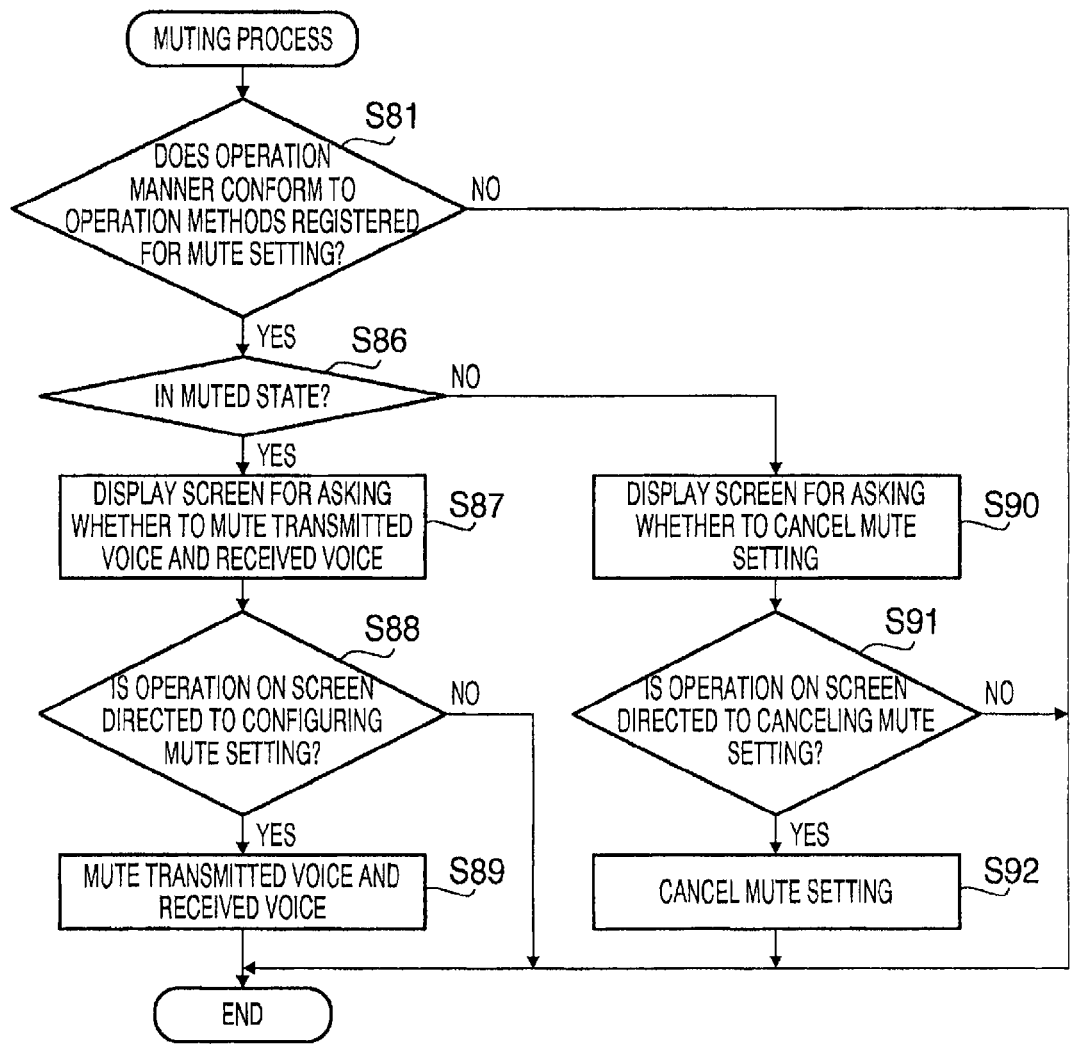

FIG. 16 is a flowchart showing a procedure of a muting process in the first embodiment according to one or more aspects of the present invention.

Figure 17A:
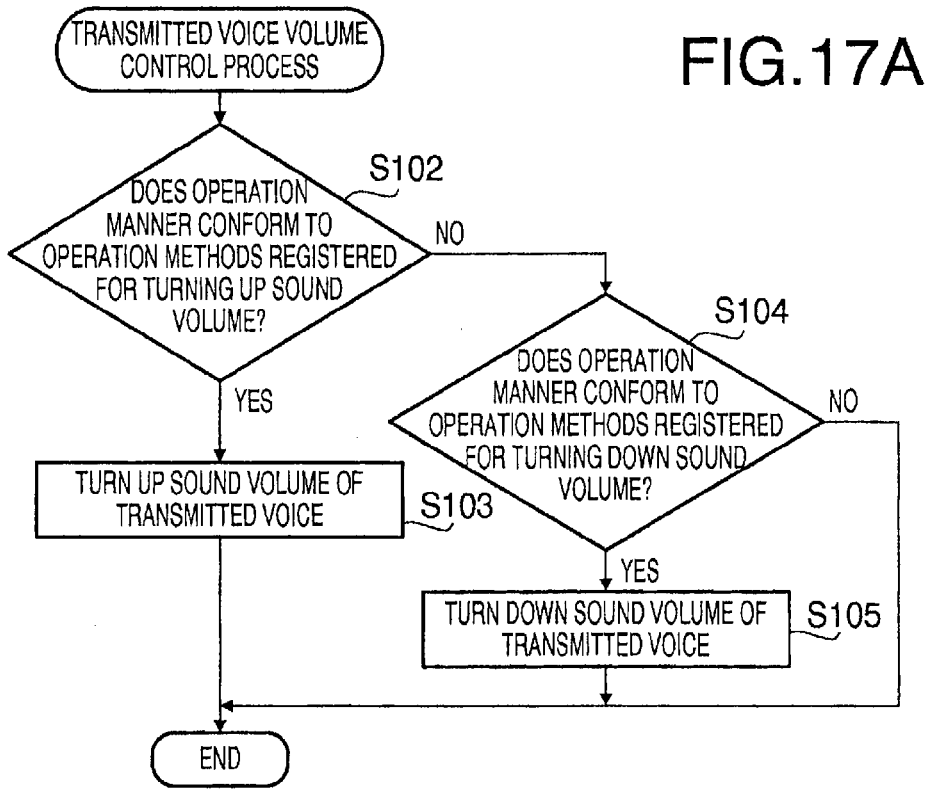

FIG. 17A is a flowchart showing a procedure of a transmitted voice volume control process in the first embodiment according to one or more aspects of the present invention.

Figure 17B:
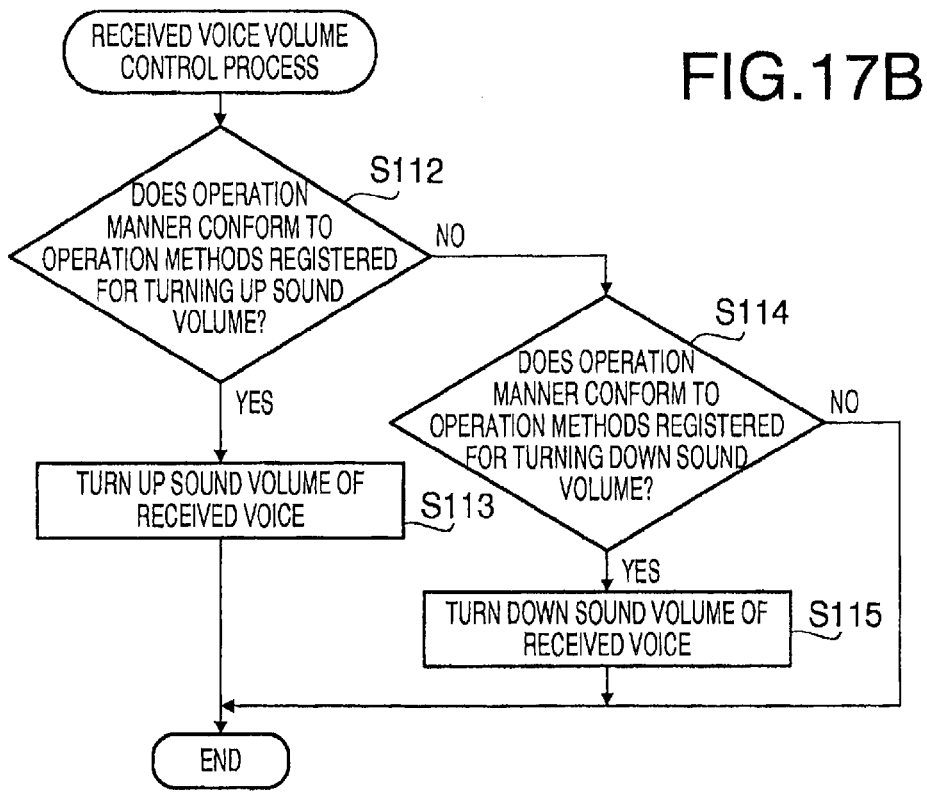

FIG. 17B is a flowchart showing a procedure of a received voice volume control process in the first embodiment according to one or more aspects of the present invention.

Figure 18:
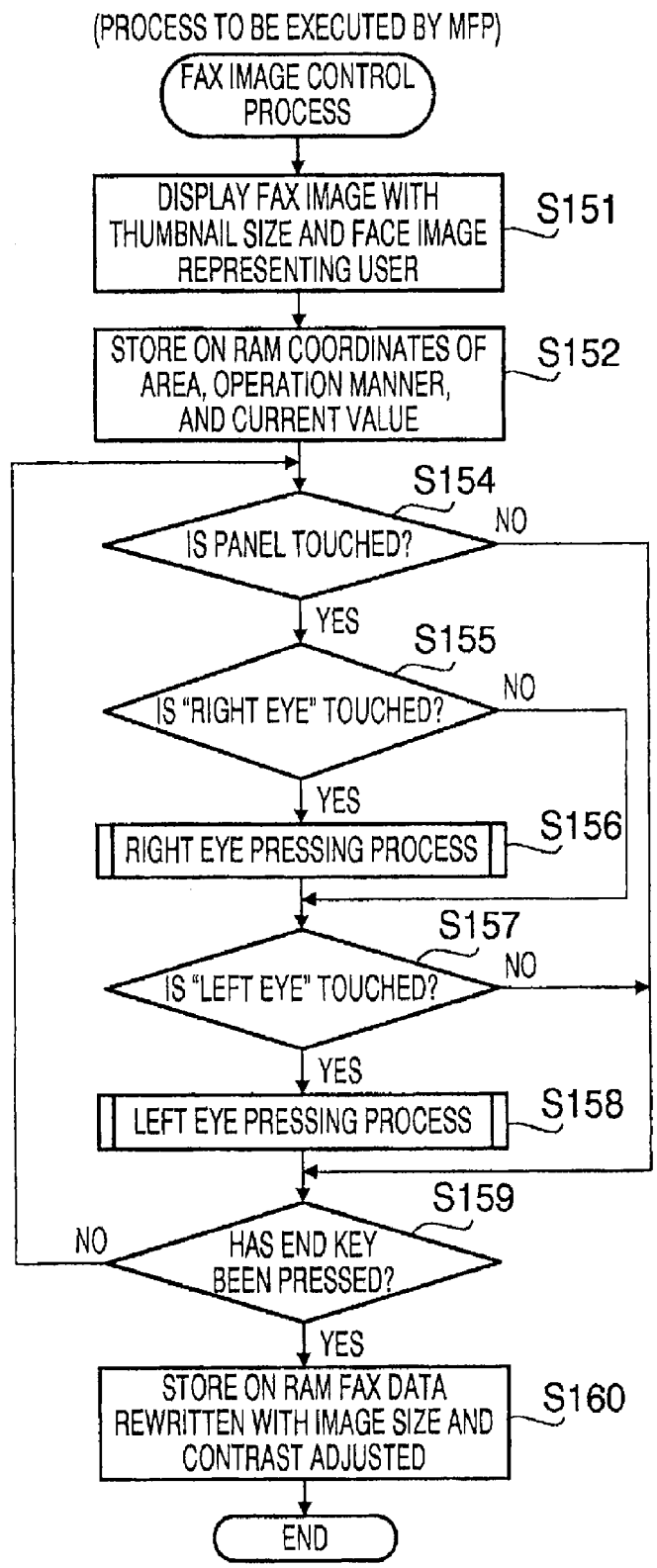

FIG. 18 is a flowchart showing a procedure of a FAX image control process in a second embodiment according to one or more aspects of the present invention.

Figure 19:
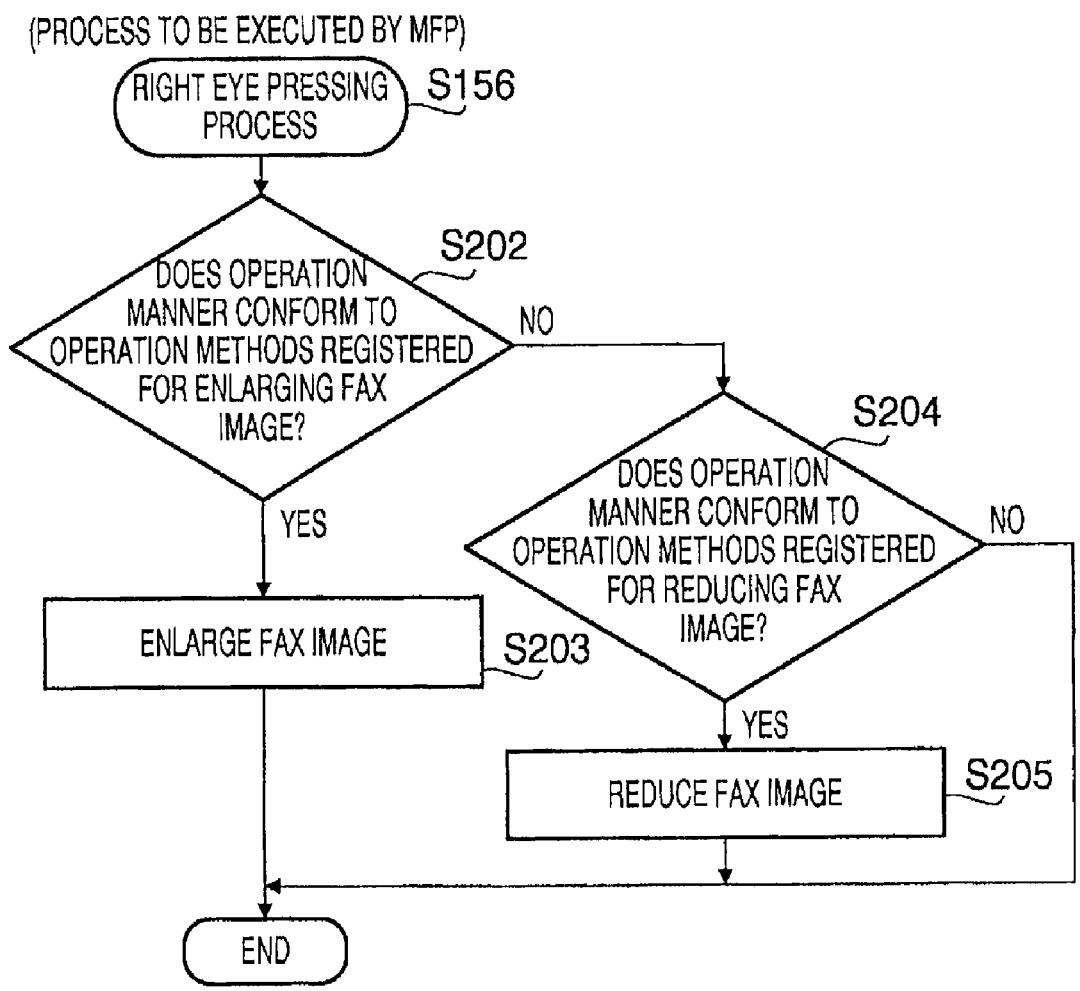

FIG. 19 is a flowchart showing a procedure of a right eye pressing process in the second embodiment according to one or more aspects of the present invention.

Figure 20:
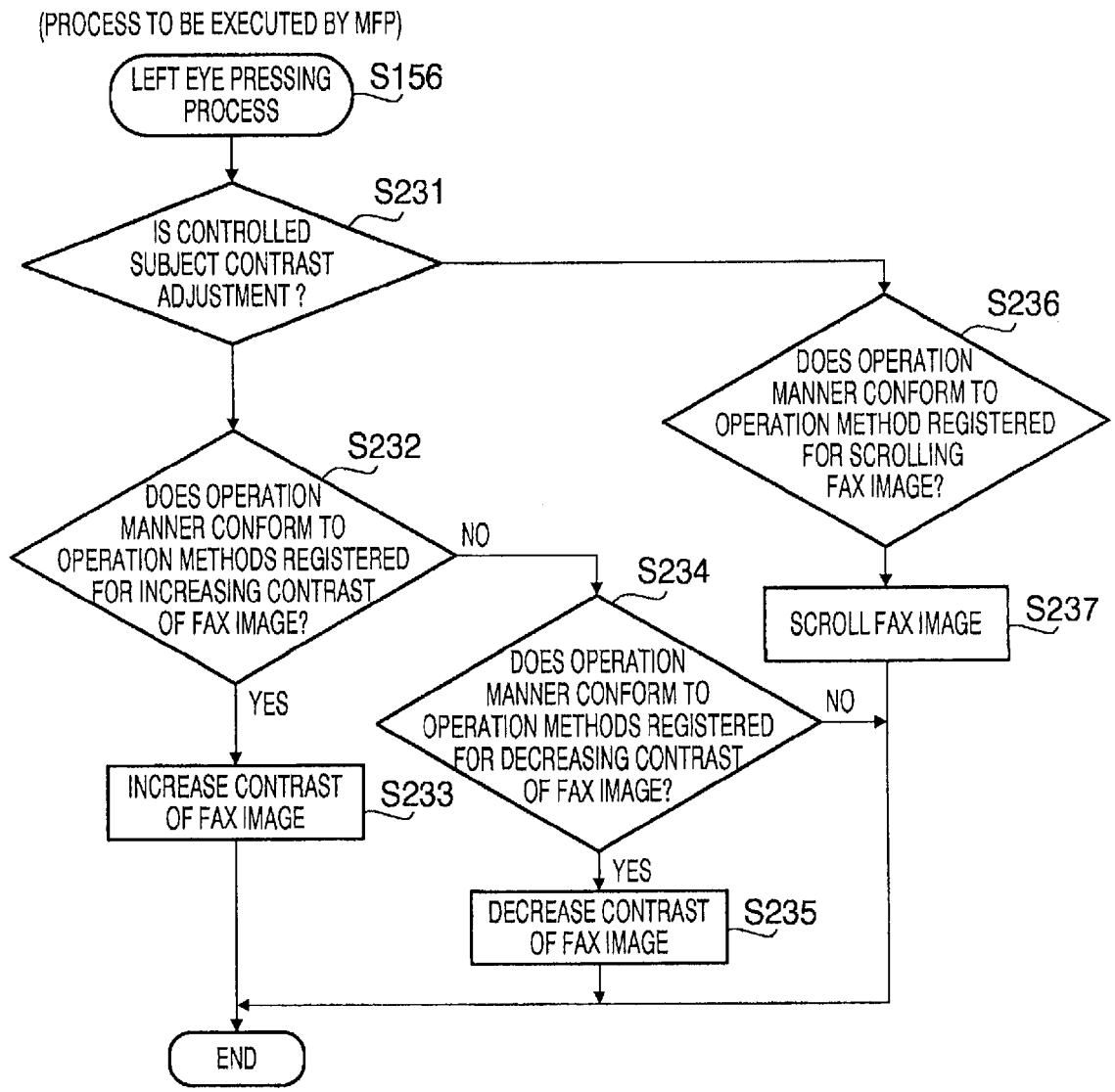

FIG. 20 is a flowchart showing a procedure of a left eye pressing process in the second embodiment according to one or more aspects of the present invention.

Figure 21:
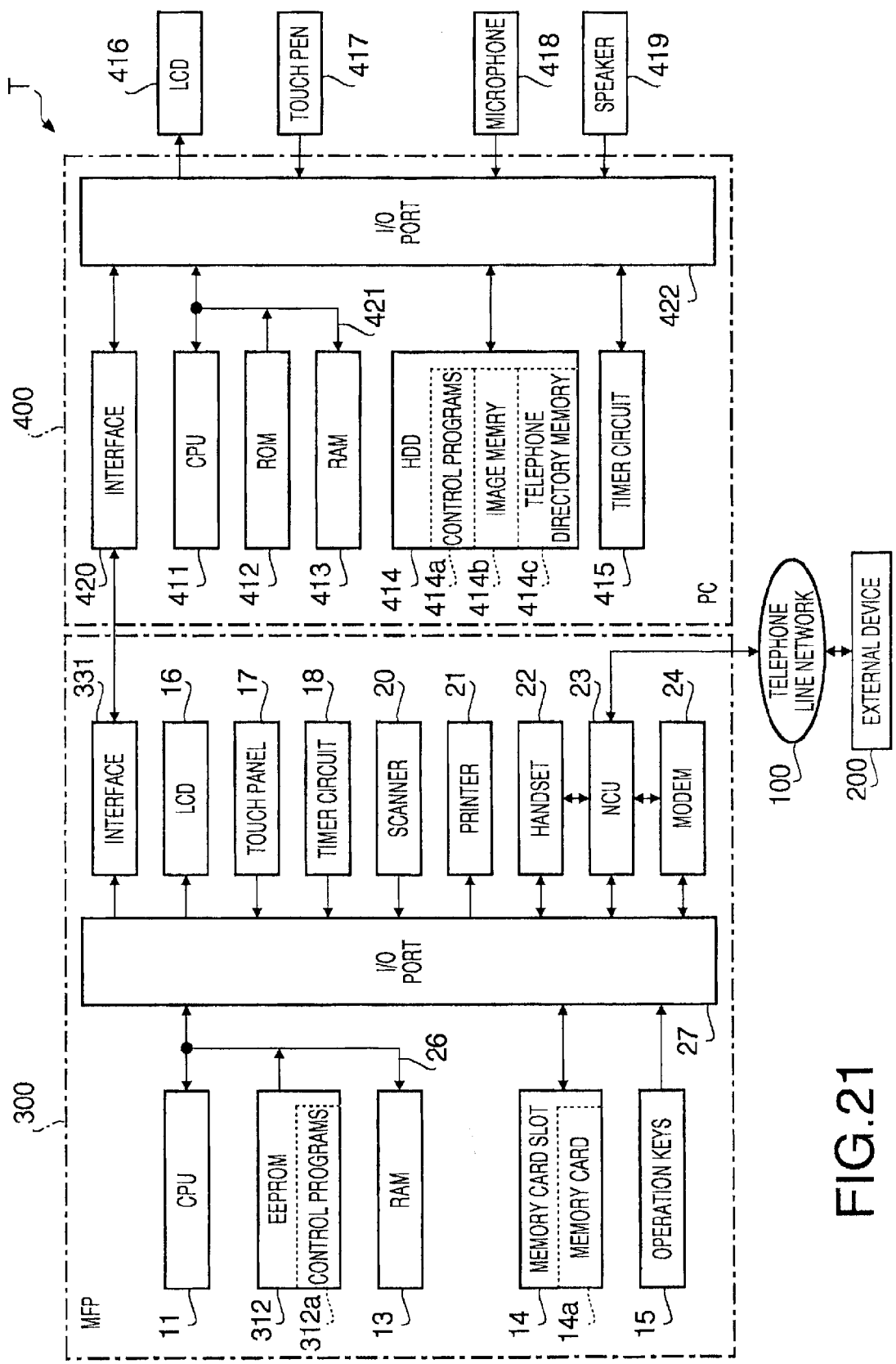

FIG. 21 is a block diagram showing an electrical configuration of a sound volume control system in a third embodiment according to one or more aspects of the present invention.

Figure 22B:
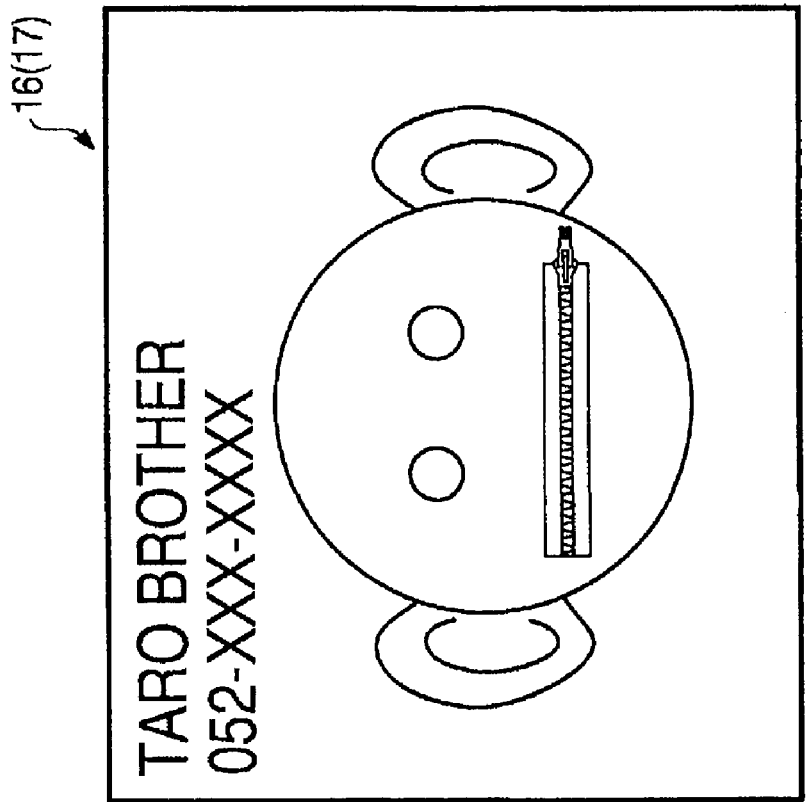
Figure 22A:
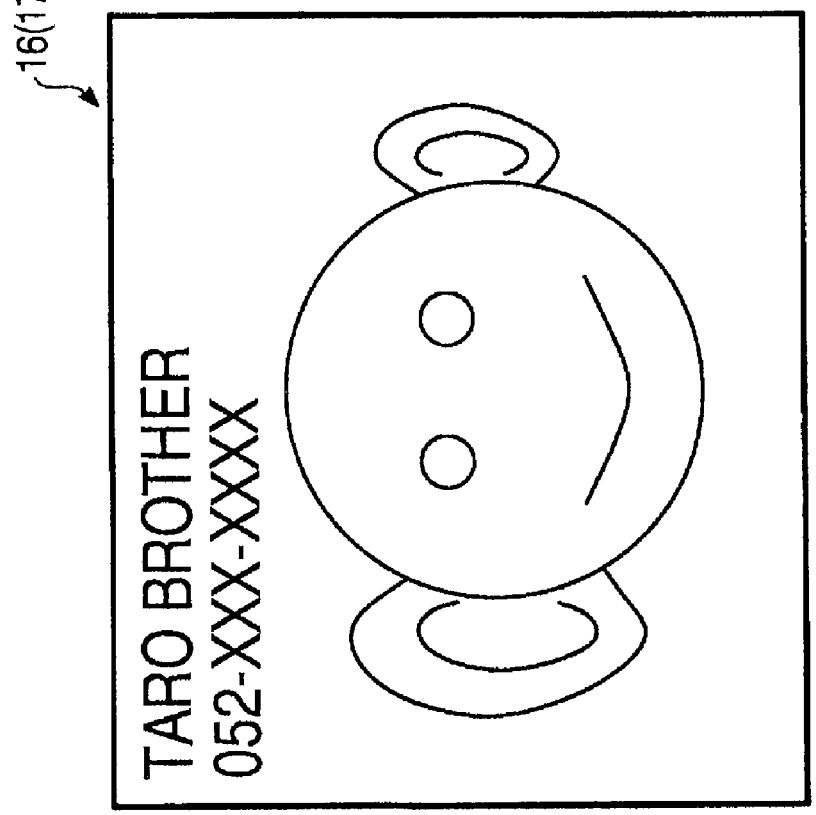

FIGS. 22A and 22B are schematic diagrams exemplifying sound volume control screens in modifications according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Figure 1:
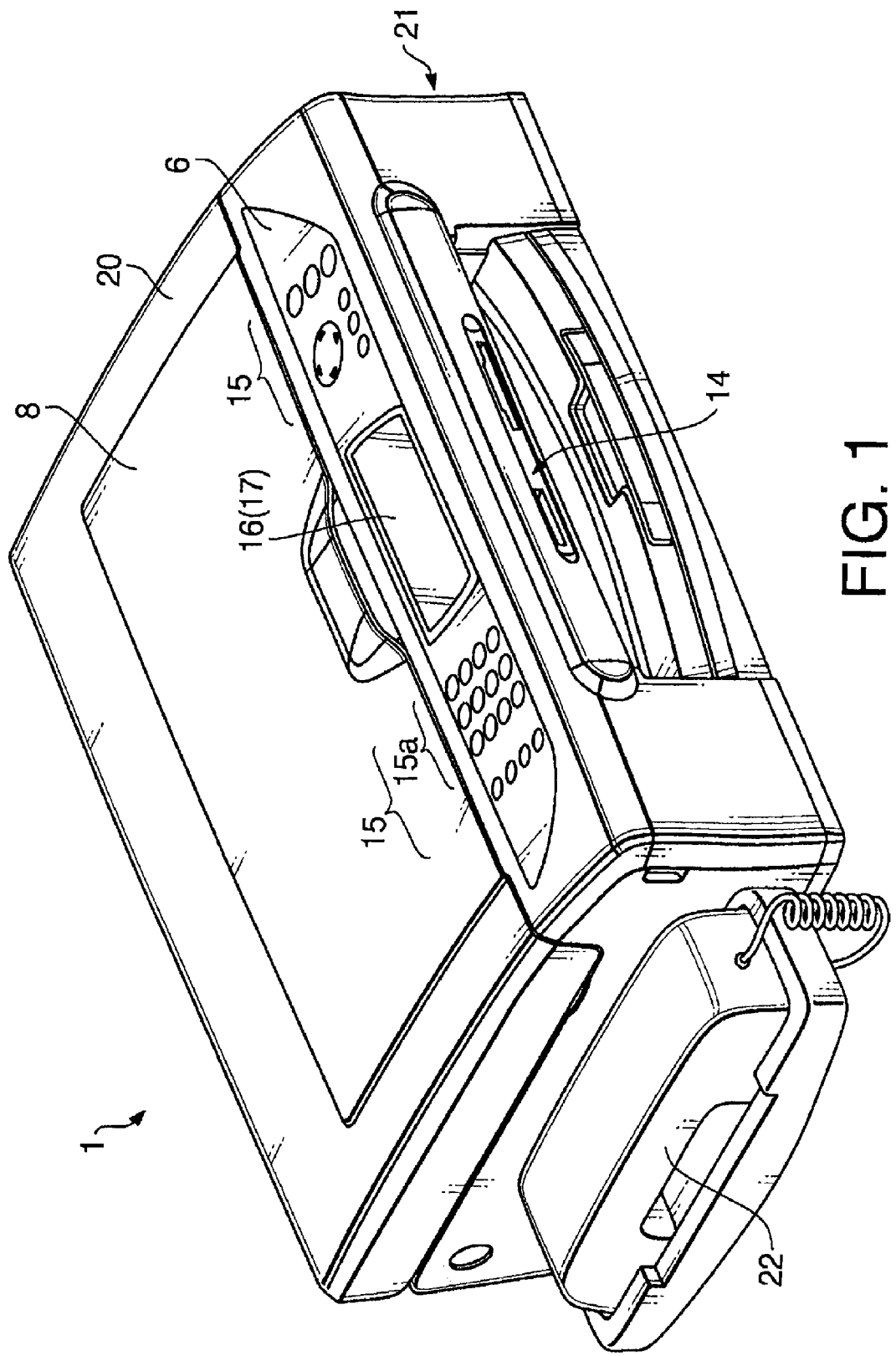
FIG. 1 is a perspective view schematically showing an external configuration of an MFP in a first embodiment according to one or more aspects of the present invention.

Hereinafter, embodiments according to aspects of the present invention will be described with reference to the accompanying drawings. FIG. 1 is a perspective view schematically showing an external configuration of a multi-function peripheral (MFP) 1 in a first embodiment.

The MFP 1 has various functions such as a telephone function, a facsimile function, a function of a personal computer (PC), a print function, a media print function, a scanner function, and a copy function. In addition, to achieve voice communication using the telephone function and data transmission using the facsimile function, the MFP 1 is connected with an external device 200 via a phone line network (see FIG. 2).

The MFP 1 is configured such that a user can intuitively control sound volumes of a received voice and a transmitted voice with a face image, which is to be displayed on a liquid crystal display (LCD) 16 depending on an intended party when the user performs voice communication with the external device 200 with the telephone function.

Further, the MFP 1 is adopted such that when receiving image data from the external device 200 with the facsimile function (hereinafter, the image data may be referred to as received FAX data), the MFP 1 displays on the LCD 16 an image representing images included in the received FAX data and a face image representing the external device 200 that is a sending source of the received FAX data. Thereby, the user can intuitively control the received FAX data that is currently being displayed using the face image displayed.

The MFP 1 includes a scanner 20 provided at an upper portion thereof. Further, the MFP 1 has a printer 21 incorporated inside a housing thereof.

In addition, the MFP 1 includes an operation panel 6 provided in front of a document cover 8, and the operation panel 6 is provided with operation keys 15, the LCD 16, and a touch panel 17. The operation keys 15 includes various sorts of buttons such as numerical buttons 15a for inputting telephone numbers when the telephone function or the facsimile function is utilized.

The LCD 16 has a horizontally-long rectangle LCD panel (not shown), which is configured to display an operation procedure, a status of an operation in execution, and information in response to pressing the operation keys 15 or the touch panel 17. Further, the LCD panel is configured to display a sound volume control screen (see FIG. 3A) for controlling the sound volume of the received voice or the transmitted voice in the voice communication between the user and the external device 200 with the telephone function, an image (not shown) for registering a face image to be displayed on the sound volume control screen, and a registration screen (see FIGS. 8A to 8D and FIGS. 9A to 9D) for configuring settings regarding the sound volume control with the face image.

In addition, the LDC 16 is configured to display an image control screen (see FIG. 6A) that allows the user to control the received FAX data (image) or transmitted FAX data (image), an image (not shown) for registering a face image to be shown on the image control screen, and a registration screen (see FIG. 10A to 10D and FIGS. 11A to 11C) for configuring settings regarding image control with the face image.

Further, the MFP 1 includes a memory card slot 14, into which a memory card 14a (see FIG. 2) is inserted, provided at a front face thereof. When the memory card 14a is inserted into the memory card slot 14, the user can make the LCD 16 display image data stored on the memory card 14a and register an intended face image data selected from the image data as a face image to be displayed on the sound volume control screen. The memory card 14a may include a CompactFlash (trademark registered), a SmartMedia (trademark registered), a Memory Stick (trademark registered), an SD Card (trademark registered), and an xD-Picture Card (trademark registered).

The MFP 1 includes a handset 22 provided at a side thereof. The handset is used when the user performs the voice communication with the external device 200 using the telephone function.

In addition, the handset 22 is provided with a voice transmitting portion (not shown) and a voice receiving portion (not shown). Voice inputted into a microphone of the voice transmitting portion is converted into sound data by the handset 22, and the converted sound is conveyed to the external device 200 as voice transmitted. Meanwhile, sound data transmitted by the external device 200 is outputted from a speaker of the voice receiving portion as voice received.

Figure 2:
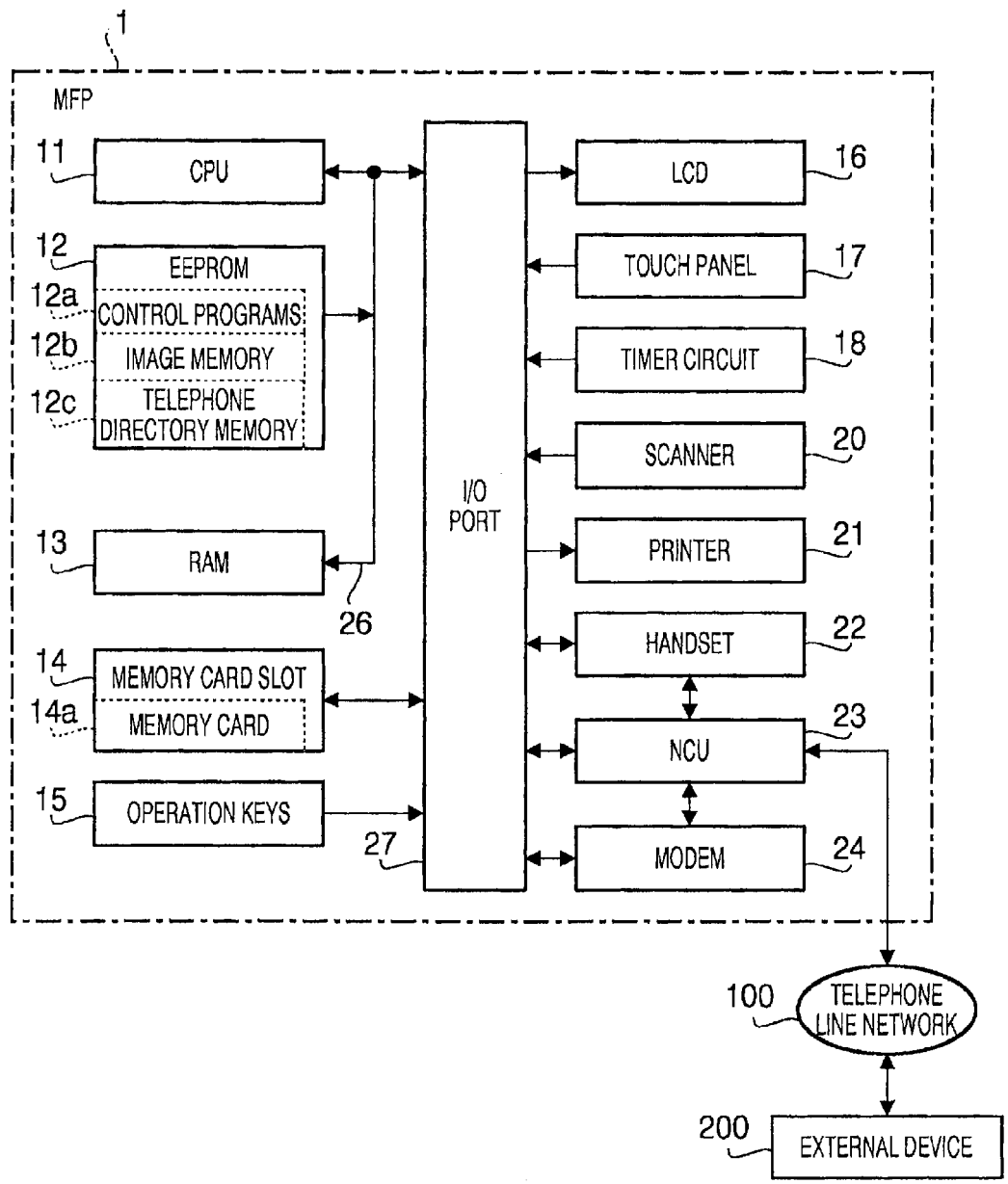
FIG. 2 is a block diagram schematically showing an electrical configuration of the MFP in the first embodiment according to one or more aspects of the present invention.

Subsequently, referring to FIG. 2, an electrical configuration of the MFP 1 will be described. FIG. 2 is a block diagram showing an electrical configuration of the MFP 1. MFP 1 includes a CPU 11, an EEPROM 12, a RAM 13, the memory card slot 14, the operation keys 15, the LCD 16, the touch panel 17, a timer circuit 18, the scanner 20. a printer 21, the handset 22, an NCU 23, and a modem 24.

The CPU 11, the EEPROM 12, and the RAM 13 are interconnected via a bus line 26. Further, the memory card slot 14, the operation keys 15, the LCD 16, the touch panel 17, the timer circuit 18, the scanner 20, the printer 21, the handset 22, the NCU 23, the modem 24, the bus line 26 are mutually linked via an Input/Output (I/O) port 27.

The CPU 11 is adopted to control each of the functions of the MFP 1 and each of the elements connected with the I/O port 27, in accordance with constant values and programs stored on the EEPROM 12 or the RAM 13, and/or various signals to be transmitted or received via the NCU 23.

The EEPROM 12 is a non-volatile memory configured to store control programs 12a to be executed by the CPU 11 and constant values in a rewritable manner and keep them stored even after the MFP 1 is powered OFF. The control programs 12a include programs for below-mentioned flowcharts shown in FIGS. 12 to 20. When the CPU 11 executes the programs, the user can intuitively control, with the MFP 1, the sound volumes of the received voice and the transmitted voice and the output condition of the received FAX image data and the transmitted FAX image data.

Further, the EEPROM 12 is provided with an image memory 12b and a telephone directory memory 12c. The image memory 12b is a memory configured to store face image data used for the sound volume control screen (see FIG. 3A) to be displayed on the LCD 16 when the voice communication is performed with the external device 200 with the telephone function and the image control screen (see FIG. 6A) for controlling the received FAX data and the transmitted FAX data. The image memory 12b stores two or more face image data previously prepared before shipment of the MFP 1, and can additionally store the face image data saved on the memory card 14a and images taken by the scanner 20 through user operations.

The face image data previously prepared before shipment of the MFP 1 include information representing whether each face image contained therein is used for the user (or for an intended party of voice communication or facsimile communication), coordinates of an ear area YB and a mouth area MB or coordinates of a right eye area RB and a left eye area LB in the face image. Thereby, when a face image contained in the previously prepared data is registered as a face image to be displayed for a party in a below-mentioned registration process (see FIG. 12), it is specified whether the face image is for the user or the intended party based on the information stored along with the face image. Additionally, the coordinates of the ear area YB and the mouth area MB or the coordinates of the right eye area RB and the left eye area LB are specified, and sound volume control areas for transmitted voice and received voice and a mute setting area, or an image control area are assigned to the specified areas.

It is noted that the coordinates of an area on a face image denote coordinates detected by the touch panel 17 when the user touches the area on the face image displayed on the LCD 16. The coordinates are defined with coordinates (0, 0) at an upper left end of the LCD panel of the LCD 16, such that an X coordinate increases toward a right side of the LCD panel while a Y coordinate increases toward a lower side of the LCD panel. In the first embodiment, the coordinates of each area on each face image are all represented by the coordinates detected on the touch panel 17. Thereby, based on a detection result for the touch panel 17, it is possible to easily determine whether a predetermined area on a face image is touched by a user's finger.

The telephone directory memory 12c is adopted to store a name and a telephone number of a party corresponding to each of two or more external devices 200. Additionally, the telephone directory memory 12c is adopted to store a file name of a face image used for the sound volume control screen or the image control screen when the user communicates with the party, and information regarding the sound volume control area for the transmitted voice, the sound volume control area for the received voice, the mute setting area, or the image control area that is assigned to the face image. It is noted that the telephone directory memory 12c will be described in detail later with reference to FIGS. 4 and 7.

The RAM 13 is a rewritable volatile memory configured to temporarily store various data in execution of each operation of the MFP 1. The timer circuit 18 is a known circuit with a clock function that provides a current date and time.

The NCU 23 is connected with the phone line network 100 and configured to take control of sending a dial signal to the phone line network 100 and responding to a call signal from the phone line network 100. The modem 24 is configured to modulate image data that is instructed to be transmitted by the facsimile function into signals transmittable to the phone line network 100 and to transmit the modulated signals via the NCU 23. Further, the modem 24 is configured to receive signals transmitted via the phone line network 100 and the NCU 23, and to display the received signals on the LCD 16 or demodulate the received signals into image data printable by the printer 21.

Figure 3A:
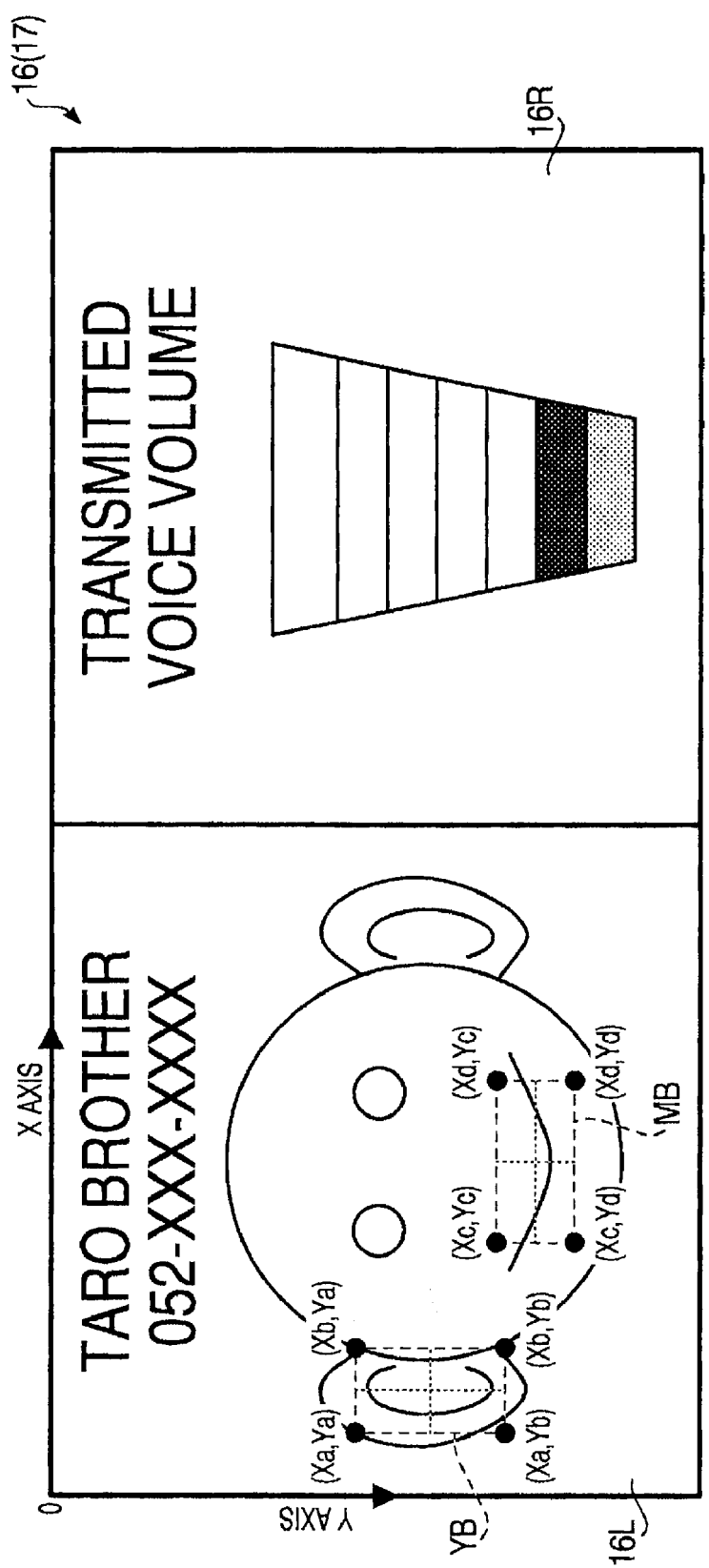
FIG. 3A is a schematic diagram exemplifying a sound volume control screen in the first embodiment according to one or more aspects of the present invention.

Next, referring to FIG. 3A, the sound volume control screen will be described in detail. FIG. 3A exemplifies a sound volume control screen.

As illustrated in FIG. 3A, the sound volume control screen is configured with two horizontally-arranged screens into which a display area of the LCD 16 is sectioned. At an upper region of a left screen 16L, there are displayed a name (TARO BROTHER) and a telephone number or a facsimile number (052-XXX-XXXX) of an intended party corresponding to the external device 200 that is stored on the telephone directory memory 12c. In addition, at the rest of the left screen 16L, a face image registered in association with the intended party is displayed.

The face image displayed on the left screen 16L includes an ear area YB (a rectangular area specified by upper left coordinates (Xa, Ya) and lower right coordinates (Xb, Yb)) and a mouth area MB (a rectangular area specified by upper left coordinates (Xc, Yc) and lower right coordinates (Xd, Yd)). The ear area YB and the mouth area MB are assigned to either the sound volume control area for the transmitted voice or the sound volume control area for the received voice, respectively, depending on a sort of the face image (namely, depending on whether the face image corresponds to the intended party or the user).

For example, when the face image is for the intended party, the ear area YB is assigned to the sound volume control area for the transmitted voice, and the mouth area MB is assigned to the sound volume control area for the received voice. Meanwhile, when the face image is for the user, the ear area YB is assigned to the sound volume control area for the received voice, and the mouth area MB is assigned to the sound volume control area for the transmitted voice.

Further, regardless of whether the face image is for the intended party or the user, either the ear area YB or the mouth area MB is assigned to the mute setting area while doubling as one of the sound volume control area for the transmitted voice and the sound volume control area for the received voice.

When the user touches the ear area YB in the face image displayed on the left screen 16L of the LCD 16, the MFP 1 determines that the touched area is the ear area YB, on the basis of a detection result of the touch panel 17. Here, when the face image displayed is for the intended party, since the ear area YB is assigned to the sound volume control area for the transmitted voice, the MFP 1 displays a bar that indicates a current sound volume of the transmitted voice on a right screen 16R of the LCD 16. Further, when the face image displayed is for the user, since the ear area YB is assigned to the sound volume control area for the received voice, the MFP 1 displays a bar that indicates a current sound volume of the received voice on the right screen 16R of the LCD 16.

Furthermore, when the user performs an operation of moving a user's finger in touch with the ear area YB, one of the sound volume of the received voice and the sound volume of the transmitted voice that is assigned to the ear area YB is controlled in response to the finger operation (displacement of a finger position detected on the touch panel 17). In addition, when the ear area YB doubles as the mute setting area, a mute setting is configured or canceled in response to the finger operation. It is noted that finger operating methods for controlling the sound volume of the transmitted voice, controlling the sound volume of the received voice, and configuring or canceling the mute setting will be described with reference to FIG. 3B.

Meanwhile, when the user touches the mouth area MB in the face image displayed on the left screen 16L of the LCD 16, the MFP 1 determines that the touched area is the mouth area MB, on the basis of a detection result of the touch panel 17. Here, when the face image displayed is for the intended party, since the mouth area MB is assigned to the sound volume control area for the received voice, the MFP 1 displays a bar that indicates a current sound volume of the received voice on a right screen 16R of the LCD 16. Further, when the face image displayed is for the user, since the mouth area MB is assigned to the sound volume control area for the transmitted voice, the MFP 1 displays a bar that indicates a current sound volume of the transmitted voice on the right screen 16R of the LCD 16.

Furthermore, when the user performs an operation of moving a user's finger in touch with the mouth area MB, one of the sound volume of the transmitted voice and the sound volume of the received voice that is assigned to the mouth area MB is controlled in response to the finger operation. In addition, when the mouth area MB doubles as the mute setting area, the mute setting is configured or canceled in response to the finger operation.

Subsequently, referring to FIG. 3B, finger operating methods for controlling the sound volume of the transmitted voice, controlling the sound volume of the received voice, and configuring or canceling the mute setting will be described. FIG. 3B is a table showing conditions of finger operations for controlling the sound volume of the transmitted voice, controlling the sound volume of the received voice, and configuring or canceling the mute setting when a face image displayed on the sound volume control screen represents the intended party of the voice communication. It is noted that the MFP 1 stores the conditions of the finger operations.

It is noted that the finger operating methods for controlling the sound volume of the transmitted voice, controlling the sound volume of the received voice, and configuring or canceling the mute setting when the face image displayed on the sound volume control screen represents the user are the same as shown in FIG. 3B, under a condition that the sound volume of the transmitted voice switches positions with the sound volume of the received voice in FIG. 3B. Therefore, explanation of the finger operating methods in this case will be omitted.

When the face image displayed on the sound volume control screen is for the intended party of the voice communication with the telephone function, the methods for operating the finger in touch with the touch panel 17 to control the sound volume of the transmitted voice include a first method in which the finger is horizontally operated and a second method in which the finger is vertically operated. The user can select either the first method or the second method as a method for controlling the sound volume of the transmitted voice in a below-mentioned registration process (see FIGS. 12 and 13).

Each of the methods has a precondition and operation manners. For example, in the case of the first method for controlling the sound volume of the transmitted voice, a precondition "$|Y2-Y1| \leqq |X2-X1|$" has to be satisfied between coordinates (X1, Y1) of a position that the finger first touches in the ear area YB and coordinates (X2, Y2) of a position that the finger last touches. Namely, when the user moves the finger substantially in a horizontal direction, the precondition is satisfied.

Under the above precondition, when the finger in touch with the touch panel 17 is moved from a left side of the ear area YB ($Xa \leqq X1 \leqq (Xa+Xb)/2$, $Ya \leqq Y1 \leqq Yb$) to a right side of the ear area YB ($(Xa+Xb)/2 < X2 \leqq Xb$, $Ya \leqq Y2 \leqq Yb$), the sound volume of the transmitted voice is turned up depending on a moving distance ($|X2-X1|$) in the X axis direction.

Meanwhile, under the precondition, when the finger in touch with the touch panel 17 is moved from the right side of the ear area YB ($(Xa+Xb)/2 < X1 \leqq Xb$, $Ya \leqq Y1 \leqq Yb$) to the left side of the ear area YB ($Xa \leqq X2 \leqq (Xa+Xb)/2$, $Ya \leqq Y2 \leqq Yb$), the sound volume of the transmitted voice is turned down depending on the moving distance ($|X2-X1|$) in the X axis direction.

On the other hand, in the case of the second method for controlling the sound volume of the transmitted voice, a precondition "$|Y2-Y1| > |X2-X1|$" has to be satisfied between the coordinates (X1, Y1) of the position that the finger first touches in the ear area YB and the coordinates (X2, Y2) of the position that the finger last touches. Namely, when the user operates the finger substantially in a vertical direction, the precondition is satisfied.

Under the precondition, when the finger in touch with the touch panel 17 is moved from a lower side of the ear area YB ($Xa \leqq X1 \leqq Xb$, $(Ya+Yb)/2 < Y1 \leqq Yb$) to an upper side of the ear area YB ($Xa \leqq X2 \leqq Xb$, $Ya \leqq Y2 \leqq (Ya+Yb)/2$), the sound volume of the transmitted voice is turned up depending on a moving distance ($|Y2-Y1|$) in the Y axis direction.

Meanwhile, under the precondition, when the finger in touch with the touch panel 17 is moved from the upper side of the ear area YB ($Xa \leqq X1 \leqq Xb$, $Ya \leqq Y1 \leqq (Ya+Yb)/2$) to the lower side of the ear area YB ($Xa \leqq X2 \leqq Xb$, $(Ya+Yb)/2 < Y2 \leqq Yb$), the sound volume of the transmitted voice is turned down depending on the moving distance ($|Y2-Y1|$) in the Y axis direction.

In addition, the sound volume of the transmitted voice controlled here is stored onto the RAM 13 and reflected on a level indicated by the bar displayed on the right screen 16R of the LCD 16. Further, the sound volume of the transmitted voice controlled here is also stored on the telephone directory memory 12c in association with the name of the intended party after the voice communication using the telephone function.

Further, the sound volume of the transmitted voice is controlled in 11 levels of "0" to "10." When the sound volume of the transmitted voice is controlled to be further turned down even in a state of the level "0," the sound volume is maintained in the level "0." Meanwhile, when the sound volume of the transmitted voice is controlled to be further turned up even in a state of the level "10," the sound volume is maintained in the level "10."

Subsequently, when the face image displayed on the sound volume control screen is for the intended party of the voice communication with the telephone function, the methods for operating the finger in touch with the touch panel 17 to control the sound volume of the received voice include a first method in which the finger is horizontally operated and a second method in which the finger is vertically operated. The user can select either the first method or the second method as a method for controlling the sound volume of the received voice in the below-mentioned registration process (see FIGS. 12 and 13).

When the first method is set as a method for controlling the sound volume of the received voice, in the same manner as described for the transmitted voice, the MFP 1 first determines whether a precondition "$|Y2-Y1| \leqq |X2-X1|$" is satisfied between coordinates (X1, Y1) of a position that the finger first touches in the mouth area MB and coordinates (X2, Y2) of a position that the finger last touches. When the precondition is satisfied, it is determined that the finger is moved substantially in the horizontal direction.

Further, when the finger in touch with the touch panel 17 is moved from a left side of the mouth area MB ($Xc \leqq X1 \leqq (Xc+Xd)/2$, $Yc \leqq Y1 \leqq Yd$) to a right side of the mouth area MB ($(Xc+Xd)/2 < X2 \leqq Xd$, $Yc \leqq Y2 \leqq Yd$) under the precondition, the sound volume of the received voice is turned up depending on the moving distance ($|X2-X1|$) in the X axis direction.

Meanwhile, when the finger in touch with the touch panel 17 is moved from the right side of the mouth area MB ($(Xc+Xd)/2 < X1 \leqq Xd$, $Yc \leqq Y1 \leqq Yd$) to the left side of the mouth area YB ($Xc \leqq X2 \leqq (Xc+Xd)/2$, $Yc \leqq Y2 \leqq Yd$) under the precondition, the sound volume of the received voice is turned down depending on the moving distance ($|X2-X1|$) in the X axis direction.

On the other hand, when the second method is set as a method for controlling the sound volume of the received voice, in the same manner as described for the transmitted voice, the MFP 1 first determines whether a precondition "$|Y2-Y1| > |X2-X1|$" is satisfied between the coordinates (X1, Y1) of the position that the finger first touches in the mouth area MB and the coordinates (X2, Y2) of the position that the finger last touches. When the precondition is satisfied, it is determined that the user moves the finger substantially in the vertical direction.

Further, when the finger in touch with the touch panel 17 is moved from a lower side of the mouth area MB ($Xc \leq X1 \leq Xd$, $(Yc+Yd)/2 < Y1 \leq Yd$) to an upper side of the mouth area MB ($Xc \leq X2 \leq Xd$, $Yc \leq Y2 \leq (Yc+Yd)/2$) under the precondition, the sound volume of the received voice is turned up depending on the moving distance ($|Y2-Y1|$) in the Y axis direction.

Meanwhile, when the finger in touch with the touch panel 17 is moved from the upper side of the mouth area MB ($Xc \leq X1 \leq Xd$, $Yc \leq Y1 \leq (Yc+Yd)/2$) to the lower side of the mouth area MB ($Xc \leq X2 \leq Xd$, $(Yc+Yd)/2 < Y2 \leq Yd$) under the precondition, the sound volume of the received voice is turned down depending on the moving distance ($|Y2-Y1|$) in the Y axis direction.

In addition, the sound volume of the received voice controlled here is stored onto the RAM 13, and the bar displayed on the right screen 16R of the LCD 16 indicates a level on which the sound volume stored on the RAM 13 is reflected. Further, the sound volume of the received voice controlled here is also stored on the telephone directory memory 12c in association with the name of the intended party after the voice communication using the telephone function.

Further, the sound volume of the received voice is as well controlled in 11 levels of 0 to 10. When the sound volume of the received voice is controlled to be further turned down even in a state of the level "0," the sound volume is maintained in the level "0." Meanwhile, when the sound volume of the received voice is controlled to be further turned up even in a state of the level "10," the sound volume is maintained in the level "10."

Additionally, preconditions and operation manners for configuring and canceling the mute setting are also shown in FIG. 3B. It is noted that "long pressing" represents an operation to keep touching a predetermined area for a predetermined time period. In the first embodiment, a time period of 1.5 seconds is set as the predetermined time period.

Configuring and canceling the mute setting are achieved by the same operation. Specifically, when an operation in each method (a first, second, or third method) for muting is performed in a non-mute state, the mute setting is configured. Meanwhile, when the operation in each method for muting is performed in a mute state, the mute setting is canceled.

The user can set one of the first to third methods in which the mute setting is configured or canceled as well as one of the ear area YB and the mouth area MB which doubles as the mute setting area, in the below-mentioned registration process (see FIGS. 12 and 13).

In this regard, however, in the case where the ear area YB doubles as the mute setting area, when the first method is set as a method for controlling the sound volume of the transmitted voice, the second method cannot be set as a method for configuring and canceling the mute setting. Further, when the second method is set as a method for controlling the sound volume of the transmitted voice, the first method cannot be set as a method for configuring and canceling the mute setting. In the same manner, in the case where the mouth area MB doubles as the mute setting area, when the first method is set as a method for controlling the sound volume of the received voice, the second method cannot be set as a method for configuring and canceling the mute setting. Further, when the second method is set as a method for controlling the sound volume of the received voice, the first method cannot be set as a method for configuring and canceling the mute setting. Thereby, it is possible to prevent the mute setting from being configured and canceled by the same finger operation as that for controlling the sound volume of the transmitted voice or the received voice.

When the first method is set as a method for configuring or canceling the mute setting, in the same manner as the second method for the sound volume of the transmitted voice, the MFP 1 first determines whether a precondition "$|Y2-Y1| > |X2-X1|$" is satisfied between coordinates ($X1, Y1$) of a position that the finger first touches in the ear area YB or the mouth area MB that is assigned to the mute setting area and coordinates ($X2, Y2$) of a position that the finger last touches. When the precondition is satisfied, it is determined that the finger is moved substantially in the vertical direction.

In the case where the ear area YB is assigned to the mute setting area, when the finger in touch with the touch panel 17 is moved from the upper side of the ear area YB ($Xa \leq X1 \leq Xb$, $Ya \leq Y1 \leq (Ya+Yb)/2$) to the lower side of the ear area YB ($Xa \leq X2 \leq Xb$, $(Ya+Yb)/2 < Y2 \leq Yb$) under the precondition, the mute setting is configured or canceled.

Further, in the case where the mouth area MB is assigned to the mute setting area, when the finger in touch with the touch panel 17 is moved from the upper side of the mouth area MB ($Xc \leq X1 \leq Xd$, $Yc \leq Y1 \leq (Yc+Yd)/2$) to the lower side of the mouth area MB ($Xc \leq X2 \leq Xd$, $(Yc+Yd)/2 < Y2 \leq Yd$) under the precondition, the mute setting is configured or canceled.

Meanwhile, when the second method is set as a method for configuring or canceling the mute setting, in the same manner as the first method, the MFP 1 first determines whether the precondition "$|Y2-Y1| \leq |X2-X|$" is satisfied between the coordinates ($X1$, $Y1$) of the position that the finger first touches in the ear area YB or the mouth area MB that is assigned to the mute setting area and the coordinates ($X2, Y2$) of the position that the finger last touches. When the precondition is satisfied, it is determined that the finger is moved substantially in the horizontal direction.

In the case where the ear area YB is assigned to the mute setting area, when the finger in touch with the touch panel 17 is moved from the left side of the ear area YB ($Xa \leq X1 \leq (Xa+Xb)/2$, $Ya \leq Y1 \leq Yb$) to the right side of the ear area YB (($Xa+Xb)/2 < X2 \leq Xb$, $Ya \leq Y2 \leq Yb$) under the precondition, the mute setting is configured or canceled.

Further, in the case where the mouth area MB is assigned to the mute setting area, when the finger in touch with the touch panel 17 is moved from the left side of the mouth area MB ($Xc \leq X1 \leq (Xc+Xd)/2$, $Yc \leq Y1 \leq Yd$) to the right side of the mouth area MB (($Xc+Xd)/2 < X2 \leq Xd$, $Yc \leq Y2 \leq Yd$) under the precondition, the mute setting is configured or canceled.

Further, in the case where the third method is set as a method for configuring and canceling the mute setting, and the ear area YB is assigned to the mute setting area, when the finger keeps touching the ear area YB ($Xa \leq X1 \leq Xb$, $Ya \leq Y1 \leq Yb$) for 1.5 seconds or longer, the mute setting is configured or canceled.

Further, in the case where the mouth area MB is assigned to the mute setting area, when the finger keeps touching the mouth area MB ($Xc \leq X1 \leq Xd$, $Yc \leq Y1 \leq Yd$) for 1.5 seconds or longer, the mute setting is configured or canceled.

Subsequently, referring to FIG. 4, the telephone directory memory 12c will be described in detail. FIG. 4 exemplifies data stored on the telephone directory memory 12c.

As shown in FIG. 4, as basic information for each party of voice communication using the telephone function, the telephone directory memory 12c stores a "name" and a "telephone number" of the party. For the "name" and the "telephone number," a predetermined character string and a predetermined numerical number string depending on each party are saved, respectively. Accordingly, information for each party stored on the telephone directory memory 12c can be searched based on the name or the telephone number of the party.

In addition, the telephone memory 12c stores an "image file name" and an "image type" of a face image to be displayed on the sound volume control screen.

Further, as detailed information of the ear area YB (namely, an item "ear" in FIG. 4) in a face image represented by the "image file name" set for each party, the telephone directory memory 12c stores an "controlled subject" assigned to the ear area YB, the upper left coordinates (Xa, Ya) and the lower right coordinates (Xb, Yb) of the ear area YB as "coordinates of area," an "operation method" for controlling the sound volume in the ear area YB, and a "current sound volume."

When the "image type" is set with "face: party in communication," a "sound volume of transmitted voice" is stored as the "controlled subject" of the "ear," and the ear area YB is associated with the sound volume control area for the transmitted voice. Further, when the "image type" is set with "face: user," a "sound volume of received voice" is stored as the "controlled subject" of the "ear," and the ear area YB is associated with the sound volume control area for the received voice.

As the "coordinates of area" (Xa, Xb, Ya, Yb) of the "ear," coordinate values are stored that represents an area to be detected as the ear area YB on the touch panel 17 when the area is touched on a face image displayed on the LCD panel of the LCD 16.

As the "operation method" of the "ear," either the "first method" or the "second method" is stored to specify a finger operation method for controlling the sound volume of the transmitted voice or the received voice assigned to the ear area YB.

As the "current sound volume" of the "ear," a current sound volume of the transmitted voice or the received voice assigned to the ear area YB is stored.

In addition, as detailed information of the mouth area MB (namely, an item "mouth" in FIG. 4) in the face image represented by the "image file name" set for each party, the telephone directory memory 12c stores an "controlled subject" assigned to the mouth area MB, the upper left coordinates (Xc, Yc) and the lower right coordinates (Xd, Yd) of the mouth area MB as "coordinates of area," an "operation method" for controlling the sound volume in the mouth area MB, and a "current sound volume." Details of each of the above items of the "mouth" are the same as those of the ear area YB, and therefore explanations of them will be omitted.

Further, as detailed information of an item "mute" for configuring or canceling the mute setting on the face image represented by the "image file name" of each party, the telephone directory memory 12c stores an "area" that specifies a mute setting area, an "operation method" for configuring or canceling the mute setting, a "hold sound" applied when the mute setting is configured, and a "hold sound volume."

As the "area" of the "mute," either the "ear" or the "mouth" is stored. When the "ear" is stored for the "area" of the "mute," the ear area YB doubles as the mute setting area. Meanwhile, when the "mouth" is stored for the "area" of the "mute," the mouth area MB doubles as the mute setting area.

As the "operation method" of the "mute," one of the "first method" to the "third method" that are finger operation methods for configuring or canceling the mute setting is stored.

As the "hold sound" of the "mute," any one of a "no hold sound," a "default hold sound," a "hold sound A," and a "hold sound B" is stored.

As the "hold sound volume" of the "mute," the sound volume of the "hold sound" to be outputted is stored. The hold sound volume" is set in 11 levels of "0" to "10."

Additionally, any item of the "image file name," the "image type," the "ear," the "mouth," and the "mute" is set concurrently when a face image to be displayed for an intended party of the voice communication is registered in the below-mentioned registration process (see FIGS. 12 and 13). When the voice communication is terminated, data stored as the "current sound volume" of each of the "ear" and the "mouth" is overwritten with a sound volume at that time.

It is noted that, as substitute for the face image, an image of a handset (a handset image) may be displayed on the LCD 16 as the sound volume controlling image depending on a party of the voice communication. In this case, the MFP 1 may be configured such that the user can intuitively control the sound volumes of the transmitted voice and the received voice on the handset image.

FIG. 5 exemplifies a handset image as a sound volume controlling image to be applied when a file name stored on the telephone directory memory 12c that corresponds to an intended party specifies an image data file of the handset image.

It is noted that the image data of the handset image (the handset image data) is stored on the image memory 12b along with the previously prepared face image data before shipment of the MFP 1. In this case, the handset image data further includes coordinates for specifying an area of a "voice transmitting portion" as the ear area YB and coordinates for specifying an area of a "voice receiving portion" as the mouth area MB.

In this case, when the MFP 1 performs voice communication using the telephone function thereof with the external device 200, the MFP 1 displays on the LCD 16 the sound volume control screen with the handset image. In addition, the voice transmitting portion YB of the handset image is assigned to the sound volume control area for the transmitted voice. Further, the voice receiving portion MB of the handset image is assigned to the sound volume control area for the received voice.

Subsequently, an image control screen to be referred to in a below-mentioned second embodiment will be described in detail with reference to FIG. 6A. FIG. 6A is a diagram exemplifying an image control screen.

It is noted that explanation of the same portions of the image control screen shown in FIG. 6A as those in FIG. 3A will be omitted. In the same manner as FIG. 3A, on an image control screen to be displayed for controlling a display state of a received FAX image, a face image corresponding to an intended party (a facsimile sending source) is displayed on the left screen 16L of the LCD 16. Further, on an image control screen to be shown for controlling a display state of a transmitted FAX image, a face image corresponding to the user is displayed on the left screen 16L.

Meanwhile, on the right screen 16R of the LCD 16, the received FAX image or the transmitted FAX image is displayed with a thumbnail size as a subject to be controlled.

The face image displayed on the left screen 16L includes a right eye area RB (a rectangular area specified by upper left coordinates (Xa, Ya) and lower right coordinates (Xb, Yb)) and a left eye area LB (a rectangular area specified by upper right coordinates (Xc, Yc) and lower right coordinates (Xd, Yd)). The right eye area RB and the left eye area LB are assigned to either image control areas for the received FAX image or image control areas for the transmitted voice, depending on a sort of the face image (namely, depending on whether the face image corresponds to the external device 200 or the user).

For example, when the face image displayed represents a party other than the user that corresponds to the external device 200, the right eye area RB and the left eye area LB are assigned to the image control areas for the received FAX image. Specifically, in the first embodiment, the right eye area RB is assigned to an area for scaling the received FAX image. Further, the left eye area LB is assigned to an area for scrolling the received FAX image.

In the meantime, when the face image displayed represents the user, the right eye area RB and the left eye area LB are assigned to the image control areas for the transmitted FAX image. Specifically, in the first embodiment, the right eye area RB is assigned to an area for scaling the transmitted FAX image. Further, the left eye area LB is assigned to an area for adjusting contrast of the transmitted FAX image.

When the user touches the right eye area RB in the face image displayed on the left screen 16L of the LCD 16, the MFP 1 determines that the touched area is the right eye area RB based on a detection result of the touch panel 17.

When the face image displayed represents a party other than the user, the right eye area RB is assigned to the image control area for enlarging and reducing the received FAX image. Therefore, the MFP 1 enlarges or reduces the received FAX image displayed at that time on the right screen 16R of the LCD 16 in response to a finger operation subsequently performed (displacement of a finger position detected on the touch panel 17).

Meanwhile, when the face image displayed represents the user, the right eye area RB is assigned to the image control area for enlarging and reducing the transmitted FAX image. Therefore, the MFP 1 enlarges or reduces the transmitted FAX image displayed at that time on the right screen 16R of the LCD 16 in response to a finger operation subsequently performed.

On the other hand, when the user touches the left eye area LB in the face image displayed on the left screen 16L of the LCD 16, the MFP 1 determines that the touched area is the left eye area LB based on a detection result of the touch panel 17.

When the face image displayed represents a party other than the user, the left eye area LB is assigned to the image control area for scrolling the received FAX image. Therefore, the MFP 1 scrolls the received FAX image displayed at that time on the right screen 16R of the LCD 16 in one of upward, downward, left, and right directions in response to a finger operation subsequently performed.

Meanwhile, when the face image displayed represents the user, the left eye area LB is assigned to the image control area for adjusting the contrast of the transmitted FAX image. Therefore, the MFP 1 adjusts the contrast of the transmitted FAX image displayed at that time on the right screen 16R of the LCD 16 in response to a finger operation subsequently performed.

Thus, in the first embodiment, when a received FAX image is displayed on the right side of the image control screen (i.e., the right screen 16R of the LCD 16) as a subject to be controlled, a face image representing the external device 200, which is a sending source of the received FAX image, is displayed on the left side of the image control screen (i.e., the left screen 16L of the LCD 16) as a subject on which a finger operation is given to control the received FAX image. Hence, the user can easily recognize the sending source of the received FAX image and control the display state of the received FAX image. Thereby, the user can intuitively control the display state of the received FAX image with the face image displayed on the left side of the image control screen.

Meanwhile, when a transmitted FAX image is displayed on the right side of the image control screen as a subject to be controlled, a face image representing the user, which is a sending source of the transmitted FAX image, is displayed on the left side of the image control screen as a subject on which a finger operation is given to control the transmitted FAX image. Hence, the user can easily recognize the sending source of the transmitted FAX image and control the display state of the transmitted FAX image. Thereby, the user can intuitively control the display state of the transmitted FAX image with the face image displayed on the left side of the image control screen.

Next, referring to FIGS. 6B and 6C, finger operating methods for controlling an image will be described. FIG. 6B is a table showing conditions of finger operations with respect to the right eye area RB for enlarging and reducing an image when a face image displayed on the image control screen represents a party other than the user, controlling the sound volume of the received voice, and configuring or canceling the mute setting. It is noted that the MFP 1 stores the conditions of the finger operations.

As shown in FIG. 6B, the methods of operating the finger in touch with the touch panel 17 to perform the image control (enlargement or reduction of the received FAX image) assigned to the right eye area RB in the face image representing a party other than the user includes a "first method" in which the finger is horizontally moved and a "second method" in which the finger is vertically moved. The user can set one of the methods in a below-mentioned registration process (see FIGS. 12 and 13).

Each of the methods has a precondition and operation manners. For example, in the case of the "first method," a precondition "$|Y2-Y1| \leq |X2-X1|$" has to be satisfied between coordinates (X1, Y1) of a position that the finger first touches in the right eye area RB and coordinates (X2, Y2) of a position that the finger last touches. Namely, when the user moves the finger substantially in a horizontal direction, the precondition is satisfied.

Under the above precondition, when the finger in touch with the touch panel 17 is moved from a left side of the right eye area RB ($Xa \leq X1 \leq (Xa+Xb)/2$, $Ya \leq Y1 \leq Yb$) to a right side of the right eye area RB ($(Xa+Xb)/2 < X2 \leq Xb$, $Ya \leq Y2 \leq Yb$), the received FAX image is enlarged depending on a moving distance ($|X2-X1|$) in the X axis direction.

Meanwhile, under the precondition, when the finger in touch with the touch panel 17 is moved from the right side of the right eye area RB ($(Xa+Xb)/2 < X1 \leq Xb$, $Ya \leq Y1 \leq Yb$) to the left side of the right eye area RB ($Xa \leq X2 \leq (Xa+Xb)/2$, $Ya \leq Y2 \leq Yb$), the received FAX image is reduced depending on the moving distance ($|X2-X1|$) in the X axis direction.

FIG. 6C is a table showing a method of operating the finger with respect to the left eye LB to scroll the received FAX image when the face image representing a party other than the user is displayed on the image control screen. As shown in FIG. 6C, a "first method" is an only method of operating the finger in touch with the touch panel 17 to perform the image control (scrolling the received FAX image) assigned to the left eye area LB in the face image representing the external device 200. This is because controls in four directions (upward, downward, left, and right) are required for scrolling the received FAX image.

In the first method for scrolling the received FAX image, a precondition "$|Y2-Y1| \leq |X2-X1|$" or a precondition "$|Y2-Y1| > |X2-X1|$" has to be satisfied between coordinates (X1, Y1) of a position that the finger first touches in the left eye area LB and coordinates (X2,Y2) of a position that the finger last touches.

Under the precondition "$|Y2-Y1| \leq |X2-X1|$," when the finger in touch with the touch panel 17 is moved from a left side of the left eye area LB ($Xc \leq X1 \leq (Xc+Xd)/2$, $Yc \leq Y1 \leq Yd$) to a right side of the left eye area LB (($Xc+Xd)/2 < X2 \leq Xd$, $Yc \leq Y2 \leq Yc$), the received FAX image is scrolled in a right direction depending on a moving distance ($|X2-X1|$) in the X axis direction.

Meanwhile, under the precondition "$|Y2-Y1| < |X2-X1|$," when the finger in touch with the touch panel 17 is moved from a lower side of the left eye area LB ($Xc \leq X1 \leq Xd$, $(Yc+Yd)/2 < Y1 \leq Yd$) to an upper side of the left eye area LB ($Xc \leq X2 \leq Xd$, $Yc \leq Y2 \leq (Yc+Yd)/2$), the received FAX image is scrolled upward depending on a moving distance ($|Y2-Y1|$) in the Y axis direction.

It is noted that drawings showing methods of operating the finger to perform image controls when the face image representing the user is displayed on the image control screen will be omitted. Finger operation methods for the image control (enlargement or reduction of the transmitted FAX image) assigned to the right eye area RB in the face image representing the user are the same as described above with reference to FIG. 6B except for a point that an image to be controlled is changed from the received FAX image to the transmitted FAX image.

Meanwhile, finger operation methods for the image control (contrast adjustment) assigned to the left eye area LB in the face image representing the user include a "first method" in which the finger is horizontally moved and a "second method" in which the finger is vertically moved, unlike the method for scrolling the received FAX image described with reference to FIG. 6C. The user can set one of the methods for the contrast adjustment in the below-mentioned registration process (see FIGS. 12 and 13). It is noted that a precondition and operation manners for increasing the contrast of the transmitted FAX image are the same as the enlargement of the received FAX image described with reference to FIG. 6B. Further, a precondition and operation manners for decreasing the contrast of the transmitted FAX image are the same as the reduction of the received FAX image described with reference to FIG. 6B.

Subsequently, referring to FIG. 7, the telephone directory memory 12c will be described in detail. FIG. 7 exemplifies data stored on the telephone directory memory 12c. As shown in FIG. 7, the telephone directory memory 12c stores information regarding a face image such as an "image type" of the face image to be displayed on the image control screen and information regarding the image control for each subject to be registered (the user and a party other than the user).

First, the telephone memory 12c stores a "facsimile number."

Further, as detailed information of the right eye area RB (namely, an item "right eye" in FIG. 7) in the face image set for each subject to be registered, the telephone directory memory 12c stores an "controlled subject" assigned to the right eye area RB, the upper left coordinates (Xa, Ya) and the lower right coordinates (Xb, Yb) of the right eye area RB as "coordinates of area," an "operation method" for enlarging or reducing the FAX image, and a "scaling ratio."

The telephone directory memory 12c stores "scaling" as the "controlled subject" of the "right eye," and the right eye area RB is associated with an area for enlarging or reducing the FAX image.

As the "coordinates of area" (Xa, Xb, Ya, Yb) of the "right eye," coordinate values are stored that represents an area to be detected as the right eye area RB on the touch panel 17 when the area is touched on a face image displayed on the LCD panel of the LCD 16.

As the "operation method" of the "right eye," either the "first method" or the "second method" is stored to specify a finger operation method for the image control assigned to the right eye area RB.

As the "scaling ratio" of the "right eye," a scaling ratio per unit length of a moving distance of the finger in touch with the right eye area RB is stored.

Further, as detailed information of the left eye area LB (namely, an item "left eye" in FIG. 7) in the face image set for each subject to be registered, the telephone directory memory 12c stores an "controlled subject" assigned to the left eye area LB, the upper left coordinates (Xc, Yc) and the lower right coordinates (Xd,Yd) of the left eye area LB as "coordinates of area," an "operation method" for an image control assigned to the left eye area LB, and a "scroll amount" or a "contrast adjustment amount."

When the "image type" is set with "face: party other than user," "scroll" is stored as the "controlled subject" of the "left eye," and the left eye area LB is associated with an area for scrolling the FAX image. Further, when the "image type" is set with "face: user," "contrast" is stored as the "controlled subject" of the "left eye," and the left eye area LB is associated with an area for controlling the contrast of the FAX image.

In addition, as the "scroll amount" that is an item stored on the telephone directory memory 12c when the "image type" is "face: party other than user," a scroll amount per unit length of a moving distance of the finger in touch with the left eye area LB is stored.

Meanwhile, as the "contrast adjustment amount" that is an item stored on the telephone directory memory 12c when the "image type" is "face: user," a contrast adjustment amount per unit length of a moving distance of the finger in touch with the left eye area LB is stored.

It is noted that explanation of details on other items of the "left eye" will be omitted, since the details are the same as those of the right eye area RB.

FIGS. 8A to 8D, 9A to 9D, 10A to 10D, and 11A to 11C are drawings exemplifying registration screens to illustrate procedures of registering output control settings on face images. The drawings will be referred to as needed for explanation of flowcharts shown in FIG. 12 and subsequent figures.

Next, referring to FIGS. 12 and 13, a registration process to be executed by the CPU 11 of the MFP 1 will be described. FIGS. 12 and 13 are flowcharts showing a procedure of the registration process. The registration process is a process to register a face image to be displayed on the sound volume control screen or the image control screen depending on a party corresponding to the external device 200. Further, in the registration process, an area on the face image registered is associated with an area for sound volume control or an area for image control. The registration process is launched in response to an instruction to register a face image to be displayed being issued by the user via the operation keys 15. At this time, information on whether the instruction is issued to register the sound volume control screen or the image control screen is stored.

In the registration process, firstly, a registered subject (a party or the user) of which a face image is to be registered is selected from the telephone directory memory 12c, or a name of the registered subject is inputted through the operation keys 15 (S1).

Subsequently, image data of the face image to be registered is selected (S2).

Then, a file name of the selected image is stored on the telephone directory memory 12c as the "image file name" (see FIG. 4) for the registered subject. Next, the CPU 11 determines whether the selected image is one of face images prepared on the image memory 12b previously before shipment of the MFP 1 (S3).

When it is determined that the selected image is one of face images previously prepared (S3: Yes), if the selected image is an image representing an intended party in the voice communication using the telephone function, "face: party in communication" is stored on the telephone directory memory 12c as the "image type" for the registered subject (see FIG. 4). Meanwhile, if the selected image is an image representing the user, "face: user" is stored on the telephone directory memory 12c as the "image type" for the registered subject. Next the CPU 11 determines whether a user instruction is directed to registering settings for the sound volume control screen or for the image control screen (S4).

When it is determined that the user instruction is directed to registering settings for the sound volume control screen (S4: Yes), the selected face image and a screen for inducing the user to touch an "ear" (see FIG. 8A) are displayed, so as to clarify whether the selected face image represents the party or the user (S5).

Then, the CPU 11 determines whether the "ear" (an ear button BT1) is touched (S6). When it is determined that the "ear" (the ear button BT1) is touched (S6: No), the step S6 is again performed.

Meanwhile, when it is determined that the "ear" (the ear button BT1) is touched (S6: Yes), the coordinates of the ear area YB in the selected face image are stored on the telephone directory memory 12c as the "coordinates of area" of the "ear" (see FIG. 4) for the registered subject. Further, when the selected face image represents the party, "sound volume of transmitted voice" is stored as the "controlled subject" of the "ear" (see FIG. 4) for the registered subject. Meanwhile, when the selected face image represents the user, "sound volume of received voice" is stored as the "controlled subject" of the "ear" for the registered subject.

Then, a registration screen (see FIGS. 8B to 8D) for configuring settings regarding the sound volume control is displayed. Through the registration screen, an operation method and an initial sound volume are accepted and stored on the telephone directory memory 12c as the "operation method" and the "current sound volume" of the "ear" for the registered subject, respectively (S7). Thereby, association of the ear area YB with the sound volume control area and various settings regarding the sound volume control are achieved.

Subsequently, in the same manner as S5, the selected face image and a screen for inducing the user to touch a "mouth" are displayed (S8). Then, the CPU 11 determines whether a button assigned to the mouth area MB is touched (S9). When it is determined that the button is not touched (S9: No), the step S9 is again performed.

When it is determined that the button assigned to the mouth area MB is touched (S9: Yes), the coordinates of the mouth area MB in the selected face image are stored on the telephone directory memory 12c as the "coordinates of area" of the "mouth" (see FIG. 4) for the registered subject. Further, when the selected face image represents the party, the "sound volume of received voice" is stored as the "controlled subject" of the "mouth" (see FIG. 4) for the registered subject. Meanwhile, when the selected face image represents the user, the "sound volume of transmitted voice" is stored as the "controlled subject" of the "mouth" for the registered subject.

Then, a registration screen for configuring settings regarding the sound volume control is displayed. Through the registration screen, an operation method and an initial sound volume are accepted and stored on the telephone directory memory 12c as the "operation method" and the "current sound volume" of the "mouth" for the registered subject, respectively (S10). Thereby, association of the mouth area MB with the sound volume control area and various settings regarding the sound volume control are achieved. After the step S10, the present process goes to S35.

Meanwhile, when it is determined that the user instruction is directed to registering settings for the image control screen (S4: No), "face: party other than user" is stored on the telephone directory memory 12c as the "image type" (see FIG. 7) for the registered subject, and a screen for inducing the user to touch a "right eye" (see FIG. 10A) is displayed, so as to clarify whether the selected face image represents the party or the user (S11).

Then, the CPU 11 determines whether the "right eye" (a right eye button BT1) is touched (S12). When it is determined that the right eye" (the right eye button BT1) is not touched (S12: No), the step S12 is again performed.

Meanwhile, when it is determined that the right eye" (the right eye button BT1) is touched (S12: Yes), the coordinates of the right eye area RB in the selected face image are stored on the telephone directory memory 12c as the "coordinates of area" of the "right eye" (see FIG. 7) for the registered subject. Further, "scaling" is stored on the telephone directory memory 12c as the "controlled subject" of the "right eye" (see FIG. 7) for the registered subject.

Then, a registration screen (see FIGS. 10B to 10D) for configuring settings regarding the image control (enlargement or reduction of the FAX image) is displayed. Through the registration screen, an operation method and a scaling ratio are accepted and stored on the telephone directory memory 12c as the "operation method" and the "scaling ratio" of the "right eye" for the registered subject, respectively (S13). Thereby, association of the right eye area RB in the face image with the image control area and various settings regarding the image control are achieved.

Subsequently, in the same manner as S11, the selected face image and a screen for inducing the user to touch a "left eye" (see FIG. 11A) are displayed (S14). Then, the CPU 11 determines whether a button assigned to the left eye area LB (a left eye button BT11) is touched (S15). When it is determined that the button is not touched (S15: No), the step S9 is again performed.

When it is determined that the button assigned to the left eye area LB is touched (S15: Yes), the coordinates of the left eye area LB in the selected face image are stored on the telephone directory memory 12c as the "coordinates of area" of the "left eye" (see FIG. 7) for the registered subject. Further, when the selected face image represents the party, "scroll" is stored as the "controlled subject" of the "left eye" (see FIG. 7) for the registered subject. Meanwhile, when the selected face image represents the user, the "contrast adjustment" is stored as the "controlled subject" of the "left eye" for the registered subject.

Then, a registration screen (see FIGS. 11B and 11C) for configuring settings regarding the image control (the image scrolling or the contrast adjustment) is displayed. Through the registration screen, a scroll amount or a contrast adjustment amount is accepted and stored on the telephone directory memory 12c as the "scroll amount" or the "contrast adjustment amount" of the "left eye" for the registered subject (S16). Thereby, association of the left eye area LB with the image control area and various settings regarding the image control are achieved. After the step S16, the present process goes to S36.

Meanwhile, when it is determined in S3 that the selected face image is not one of face images prepared on the image memory 12b previously before shipment of the MFP 1 but an image acquired from another element such as the memory card 14a and the scanner 20 (S3: No), a screen for determining whether the selected face image is applied as an image representing the party or the user is displayed (S17). Here, when it is determined that the selected face image is applied as an image representing the party, "face: party in communication" is stored on the telephone directory memory 12c as the "image type" (see FIG. 4) for the registered subject. Meanwhile, when it is determined that the selected face image is applied as an image representing the user, "face: user" is stored on the telephone directory memory 12c as the "image type" for the registered subject. After that, the present process goes to S18 in FIG. 13.

In S18 in FIG. 13, the CPU 11 determines whether a user instruction issued in S17 is directed to registering settings for the sound volume control screen or for the image control screen (S18). When it is determined that the user instruction is directed to registering settings for the sound volume control screen (S18: Yes), an image for setting the ear area YB on the face image is displayed (S19).

Then, the CPU 11 determines whether there is an input for specifying the ear area YB (S20). When it is determined that there is not an input for specifying the ear area YB (S20: No), the step S20 is again performed.

Meanwhile, when it is determined that there is an input for specifying the ear area YB (S20: Yes), coordinates of the specified area are extracted, accepted as the sound volume control area, and stored on the telephone directory memory 12c as the "coordinates of area" of the "ear" (see FIG. 4) for the registered subject. Here, when the face image is specified as an image representing the party, the "sound volume of transmitted voice" is stored as the "controlled subject" of the "ear" (see FIG. 4) for the registered subject. Meanwhile, when the face image is specified as an image representing the user, the "sound volume of received voice" is stored as the "controlled subject" of the "ear" for the registered subject (S21).

Then, the registration screen (see FIGS. 8B to 8D) for configuring the settings regarding the sound volume control is displayed. Through the registration screen, an operation method and an initial sound volume are accepted and stored on the telephone directory memory 12c as the "operation method" and the "current sound volume" of the "ear" for the registered subject, respectively (S22). Thereby, association of the ear area YB with the sound volume control area and various settings regarding the sound volume control are achieved.

Subsequently, an image for setting the mouth area MB on the face image is displayed (S23). Then, the CPU 11 determines whether there is an input for specifying the mouth area MB (S24). When it is determined that there is not an input for specifying the mouth area MB (S24: No), the step S24 is again performed.

Meanwhile, when it is determined in S24 that there is an input for specifying the mouth area MB (S24: Yes), coordinates of the specified area are extracted, accepted as the sound volume control area, and stored on the telephone directory memory 12c as the "coordinates of area" of the "mouth" (see FIG. 4) for the registered subject. Here, when the face image is specified as an image representing the party, the "sound volume of received voice" is stored as the "controlled subject" of the "mouth" (see FIG. 4) for the registered subject. Meanwhile, when the face image is specified as an image representing the user, the "sound volume of transmitted voice" is stored as the "controlled subject" of the "mouth" for the registered subject (S25).

Then, the registration screen for configuring the settings regarding the sound volume control is displayed. Through the registration screen, an operation method and an initial sound volume are accepted and stored on the telephone directory memory 12c as the "operation method" and the "current sound volume" of the "mouth" for the registered subject, respectively (S26). Thereby, association of the mouth area MB with the sound volume control area and various settings regarding the sound volume control are achieved. After the step S26, the present process goes to S35B.

Meanwhile, when it is determined that the user instruction is directed to registering settings for the image control screen (S18: No), an image for setting the right eye area RB on the face image (S27).

Then, the CPU 11 determines whether there is an input for specifying the right area RB (S28). When it is determined that there is not an input for specifying the right eye area RB (S28: No), the step S28 is again performed.

Meanwhile, when it is determined that there is an input for specifying the right eye area RB (S28: Yes), coordinates of the specified area are extracted, accepted as the image control area, and stored on the telephone directory memory 12c as the "coordinates of area" of the "right eye" (see FIG. 7) for the registered subject. In addition, "scaling" is stored as the "controlled subject" of the "right eye" (see FIG. 4) for the registered subject (S29).

Subsequently, the registration screen for configuring the settings regarding the image control (enlargement or reduction of the FAX image) is displayed. Through the registration screen, an operation method and a scaling ratio are accepted and stored on the telephone directory memory 12c as the "operation method" and the "scaling ratio" of the "right eye" for the registered subject, respectively (S30). Thereby, association of the right eye area RB with the image control area and various settings regarding the image control are achieved.

Next, an image for setting the left eye area LB on the face image selected is displayed (S31). Then, the CPU 11 determines whether there is an input for specifying the left eye area LB (S32). When it is determined that there is not an input for specifying the left eye area LB (S32: No), the step S32 is again performed.

Meanwhile, when it is determined in S32 that there is an input for specifying the left eye area LB (S32: Yes), coordinates of the specified area are extracted, accepted as the image control area, and stored on the telephone directory memory 12c as the "coordinates of area" of the "left eye" (see FIG. 7) for the registered subject. Further, "contrast adjustment" is stored as the "controlled subject" of the "left eye" (see FIG. 7) for the registered subject (S33).

Then, a registration screen for configuring settings regarding the image control (contrast adjustment for the FAX image) is displayed. Through the registration screen, an operation method and a contrast adjustment amount are accepted and stored on the telephone directory memory 12c as the "operation method" and the "contrast adjustment amount" of the "left eye" for the registered subject, respectively (S34). Thereby, association of the left eye area LB with the image control area and various settings regarding the image control (namely, the contrast adjustment for the transmitted FAX image) are achieved. After the step S34, the present process goes to S36 in FIG. 12.

In S36 in FIG. 12, the CPU 11 determines whether a different registered subject of which a face image is to be registered is selected from the telephone directory memory 12c, or whether a name of the different registered subject is inputted through the operation keys 15 (S36). When it is determined that a different registered subject of which a face image is to be registered is selected from the telephone directory memory 12c, or that a name of the different registered subject is inputted through the operation keys 15 (S36: Yes), the present process goes back to S2, and the steps S2 to S36 are re-executed.

Meanwhile, when it is determined that a different registered subject of which a face image is to be registered is not selected from the telephone directory memory 12c, and that a name of the different registered subject is not inputted through the operation keys 15 (S36: No), the registration process is terminated.

In S35 to be executed after S10, a registration screen (see FIGS. 9A to 9D) for configuring various settings regarding the mute setting is displayed. Through the registration screen, a mute setting area, an operation method, a hold sound, and a volume of the hold sound are accepted and stored on the telephone directory memory 12c as the "area," the "operation method," the "hold sound," and the "hold sound volume" of the "mute" for the registered subject, respectively (S35). Thereby, the various settings regarding the mute setting are completed. It is noted that the same operation as S35 is as well performed in S35B in FIG. 13.

Subsequently, in S36, the CPU 11 determines whether a different registered subject of which a face image is to be registered is selected from the telephone directory memory 12c, or whether a name of the different registered subject is inputted through the operation keys 15 (S36). When it is determined that a different registered subject of which a face image is to be registered is selected from the telephone directory memory 12c, or that a name of the different registered subject is inputted through the operation keys 15 (S36: Yes), the present process goes back to S2, and the steps S2 to S36 are re-executed.

Meanwhile, when it is determined that a different registered subject of which a face image is to be registered is not selected from the telephone directory memory 12c, and that a name of the different registered subject is not inputted through the operation keys 15 (S36: No), the registration process is terminated.

Hereinabove, according to the registration process, the user can set by himself operation methods on the sound volume control area for the transmitted voice, the sound volume control area for the received voice, and the sound volume control area for configuring or canceling the mute setting. Therefore, the user can control the sound volumes of the transmitted voice and the received voice and configure or cancel the mute setting through intuitive user operations on the sound volume control screen.

In addition, when an image to be registered is acquired from the memory card 14a or the scanner 20, the user can set by himself the ear area YB and the mouth area MB assigned to the sound volume control areas for the transmitted voice, the received voice, and the mute setting. Therefore, the user can control the sound volumes of the transmitted voice and the received voice and configure or cancel the mute setting through intuitive user operations on the sound volume control screen.

Further, according to the registration process, the user can set by himself operation methods on the image control area for controlling the received FAX image and the transmitted FAX image. Therefore, the user can control the received FAX image or the transmitted FAX image through intuitive user operations on the image control screen.

In addition, when an image to be registered is acquired from the memory card 14a or the scanner 20, the user can set by himself the right eye area RB and the left eye area LB assigned to the image control areas. Therefore, the user can control the received FAX image or the transmitted FAX image through intuitive user operations on the image control screen.

Next, referring to FIG. 14, a sound volume control process to be executed by the CPU 11 of the MFP 1 will be described. FIG. 14 is a flowchart showing a sound volume control process. The sound volume control process is adopted to, when the user performs voice communication using the telephone function with the external device 200, display the sound volume control screen on the LCD 16 and control the sound volumes of the received voice and the transmitted voice depending on a finger operation on the sound volume control screen. The sound volume control process is launched in response to an instruction to start the voice communication using the telephone function with the external device 200 being issued by the user.

In the sound volume control process, firstly, an "image file name" (see FIG. 4) is read out that is stored on the telephone directory memory 12c for the intended party in the voice communication that corresponds to the external device 200. Then, an image file specified by the image file name is read out from the image memory 12b. A face image is displayed in accordance with face image data of the image file (S41).

Subsequently, the "controlled subject," the "coordinates of area," the "operation method," and the "current sound volume" of the "ear" for the intended party in the voice communication that corresponds to the external device 200 are read out from the telephone directory memory 12c and stored onto the RAM 13 (S42). Thereby, the ear area YB defined by the "coordinates of area" in the face image on the sound volume control screen is assigned to the sound volume control area for the transmitted voice or the received voice in accordance with the "controlled subject." Further, the "operation method" defines operation manners in which the finger is moved in the ear area YB for the sound volume control. Additionally, the "current sound volume" defines the sound volume of the transmitted voice or the received voice at the present time.

In addition, in S42, the "controlled subject," the "coordinates of area," the "operation method," and the "current sound volume" of the "mouth" for the intended party in the voice communication that corresponds to the external device 200 are read out from the telephone directory memory 12c and stored onto the RAM 13. Thereby, the mouth area MB defined by the "coordinates of area" in the face image on the sound volume control screen is assigned to the sound volume control area for the transmitted voice or the received voice in accordance with the "controlled subject." Further, the "operation method" defines operation manners in which the finger is moved in the mouth area MB for the sound volume control. Additionally, the "current sound volume" defines the sound volume of the transmitted voice or the received voice at the present time.

Further, in S42, the "area," the "operation method," the "hold sound," and the "hold sound volume" of the "mute" for the intended party in the voice communication that corresponds to the external device 200 are read out from the telephone directory memory 12c and stored onto the RAM 13. Thereby, either the ear area YB or the mouth area MB defined by the "area" in the face image on the sound volume control screen is assigned to the mute setting area. Further, the "operation method" defines operation manners in which the finger is moved to configure or cancel the mute setting. Additionally, the "hold sound" and the "hold sound volume" define a hold sound to be outputted under the mute setting and the volume of the hold sound, respectively.

After the step S42, the CPU 11 determines whether the touch panel 17 is touched (S45). When it is determined that the touch panel 17 is touched (S45: Yes), the CPU 11 determines whether the touched area is the ear area YB assigned in S42 (S46). When it is determined that the touched area is the ear area YB (S46: Yes), a below-mentioned ear pressing process (see FIG. 15A) is performed (S47), and the present process goes to S48. Thereby, based on the sound volume control area and the operation method assigned to the ear area YB, a predetermined voice volume control process or muting process can be carried out.

Meanwhile, in S46, when it is determined that the touched area is not the ear area YB (S46: No), the present process goes to S48 without involving S47.

In S48, the CPU 11 determines whether the area touched in S45 is the mouth area MB assigned in S42 (S48). When it is determined that the area touched is the mouth area MB assigned (S48: Yes), a below-mentioned mouth pressing process (see FIG. 15B) is performed (S49), and the present process goes to S50. Thereby, based on the sound volume control area and the operation method assigned to the mouth area MB, a predetermined voice volume control process or muting process can be carried out.

Meanwhile, when it is determined that the area touched in S45 is the mouth area MB assigned in S42 (S48: No), the present process goes to S50 without involving S49.

Further, when it is determined in S45 that the touch panel 17 is not touched (S45: No), the present process goes to S50.

In S50, the CPU 11 determines whether the voice communication is terminated with the handset 22 being in an off-hook state (S50). When it is determined that the handset 22 is in an on-hook state and the voice communication is not terminated (S50: No), the present process goes back to S45, and the steps S45 to S50 are re-executed.

Meanwhile, in S50, when it is determined that the voice communication is terminated (S50: Yes), the current sound volumes of the transmitted voice and the received voice controlled on the ear area YB and the mouth area MB are respectively stored on the telephone directory memory 12c as the "current sound volume" of the "ear" and the "current sound volume" of the "mouth" for the intended party in the voice communication that corresponds to the external device 200 (S51). Then, the sound volume control process is terminated. Thereby, when the user performs next voice communication with the party, the sound volumes of the transmitted voice and the received voice are respectively set in the volumes at the time when this voice communication is terminated.

Next, referring to FIG. 15A, an ear pressing process to be executed by the CPU 11 of the MFP 1 will be described. FIG. 15A is a flowchart showing an ear pressing process. The ear pressing process is a process to be executed in the sound volume control process as mentioned above. Specifically, the ear pressing process is adopted to, when the ear area YB is touched by a finger on the sound volume control screen, perform a predetermined voice volume control process or muting process based on a sound volume control area and an operation method assigned to the ear area YB.

In the ear pressing process, firstly, a current sound volume of a subject to be controlled on the ear area YB is read out from the RAM 13 and displayed in a format of sound volume bar on the right screen 16R of the LCD 16 (see FIG. 3A) (S61). Thereby, the user can know the sound volume of the transmitted voice or the received voice as the controlled subject. Thus, the sound volume bar can be used as indication for the sound volume control.

Subsequently, based on the information stored on the RAM 13 in S42 shown in FIG. 14, the CPU 11 determines whether the mute setting area is assigned to the ear area YB (S62). When it is determined that the mute setting area is assigned to the ear area YB (S62: Yes), a below-mentioned muting process (see FIG. 16) is performed (S63), and the present process goes to S64. Thereby, when the finger is moved to conform to the operation method for the mute setting area, the mute setting is configured or canceled.

Meanwhile, in S62, when it is determined that the mute setting area is not assigned to the ear area YB (S62: No), the present process goes to S64 without involving S63.

In S64, based on the information stored on the RAM 13 in S42 shown in FIG. 14, the CPU 11 determines whether an controlled subject assigned to the ear area YB is the sound volume of the transmitted voice (S64). When it is determined that the controlled subject assigned to the ear area YB is the sound volume of the transmitted voice (S64: Yes), a below-mentioned transmitted voice volume control process (see FIG. 17A) is performed (S65), and the ear pressing process is terminated. Thereby, when the finger is moved to conform to the operation method for the sound volume control area for the transmitted voice, the sound volume of the transmitted voice is controlled.

Meanwhile, when it is determined that the controlled subject assigned to the ear area YB is not the sound volume of the transmitted voice but the sound volume of the received voice (S64: No), a below-mentioned received voice volume control process (see FIG. 17B) is performed (S66), and the ear pressing process is terminated. Thereby, when the finger is moved to conform to the operation method for the sound volume control area for the received voice, the sound volume of the received voice is controlled.

Next, referring to FIG. 15B, a mouth pressing process to be executed by the CPU 11 of the MFP 1 will be described. FIG. 15B is a flowchart showing a mouth pressing process. The mouth pressing process is a process to be executed in the sound volume control process as mentioned above. Specifically, the mouth pressing process is adopted to, when the mouth area MB is touched by a finger on the sound volume control screen, perform a predetermined voice volume control process or muting process based on a sound volume control area and an operation method assigned to the mouth area MB.

In the mouth pressing process, firstly, a current sound volume of a subject to be controlled on the mouth area MB is read out from the RAM 13 and displayed in a format of sound volume bar on the right screen 16R of the LCD 16 (see FIG. 3A) (S71). Thereby, the user can know the sound volume of the transmitted voice or the received voice as the controlled subject. Thus, the sound volume bar can be used as indication for the sound volume control.

Subsequently, based on the information stored on the RAM 13 in S42 shown in FIG. 14, the CPU 11 determines whether the mute setting area is assigned to the mouth area MB (S72). When it is determined that the mute setting area is assigned to the mouth area MB (S72: Yes), a below-mentioned muting process (see FIG. 16) is performed (S73), and the present process goes to S74. Thereby, when the finger is moved to conform to the operation method for the mute setting area, the mute setting is configured or canceled.

Meanwhile, in S72, when it is determined that the mute setting area is not assigned to the mouth area MB (S72: No), the present process goes to S74 without involving S73.

In S74, based on the information stored on the RAM 13 in S42 shown in FIG. 14, the CPU 11 determines whether a controlled subject assigned to the mouth area MB is the sound volume of the transmitted voice (S74). When it is determined that the controlled subject assigned to the mouth area MB is the sound volume of the transmitted voice (S74: Yes), the below-mentioned transmitted voice volume control process (see FIG. 17A) is performed (S75), and the mouth pressing process is terminated. Thereby, when the finger is moved to conform to the operation method for the sound volume control area for the transmitted voice, the sound volume of the transmitted voice is controlled.

Meanwhile, when it is determined that the controlled subject assigned to the mouth area MB is not the sound volume of the transmitted voice but the sound volume of the received voice (S74: No), a below-mentioned received voice volume control process (see FIG. 17B) is performed (S76), and the mouth pressing process is terminated. Thereby, when the finger is moved to conform to the operation method for the sound volume control area for the received voice, the sound volume of the received voice is controlled.

Next, referring to FIG. 16, a muting process to be executed by the CPU 11 of the MFP 1 will be described. FIG. 16 is a flowchart showing a muting process. The muting process is a process to be executed in the ear pressing process or the mouth pressing process as mentioned above. Specifically, the muting process is adopted to configure or cancel the mute setting when the finger is moved to conform to an operation method for the mute setting area assigned to the ear area YB or the mouth area MB.

In the muting process, firstly, based on the information stored on the RAM 13 in S42 shown in FIG. 14, the CPU 11 determines whether an operation manner on the mute setting area conforms to the operation methods registered for configuring or canceling the mute setting (S81). More specifically, the CPU 11 determines whether the operation manner on the mute setting area is either of the first to third methods shown in FIG. 3B. The first method is, as shown in FIG. 3B, adopted to configure or cancel the mute setting when the finger in touch with the mute setting area is moved from upside to downside.

The second method is, as shown in FIG. 3B, adopted to configure or cancel the mute setting when the finger in touch with the mute setting area is moved from left to right. The third method is, as shown in FIG. 3B, adopted to configure or cancel the mute setting when the finger in touch with the mute setting area is kept pressed for 1.5 seconds.

In S81, when it is determined that the operation manner on the mute setting area does not conform to the operation methods registered for configuring or canceling the mute setting (S81: No), the muting process is terminated. Meanwhile, when it is determined that the operation manner on the mute setting area conforms to the operation methods registered for configuring or canceling the mute setting (S81: Yes), the present process goes to S86.

In S86, the CPU 11 determines whether the transmitted voice and the received voice are currently muted (S86). When it is determined that neither the transmitted voice nor the received voice is currently muted (S86: No), a screen for asking the user whether to mute the transmitted voice and the received voice is displayed on the LCD 16 (S87). Then, the CPU 11 determines whether an operation on the screen is directed to muting the transmitted voice and the received voice (S88). When it is determined that the operation on the screen is directed to muting the transmitted voice and the received voice (S88: Yes), the transmitted voice and the received voice are muted (S89). At this time, the hold sound stored on the RAM 13 in S42 in FIG. 14 is outputted with the hold sound volume stored on the RAM 13. Thereafter, the muting process is terminated.

Meanwhile, when it is determined that the operation on the screen is not directed to muting the transmitted voice and the received voice (S88: No), the muting process is terminated without involving S89.

Further, when it is determined that the transmitted voice and the received voice is currently muted (S86: Yes), a screen for asking the user whether to cancel the mute setting is displayed on the LCD 16 (S90). Then, the CPU 11 determines whether an operation on the screen is directed to canceling the mute setting (S91). When it is determined that the operation on the screen is directed to canceling the mute setting (S91: Yes), the mute setting is canceled, and the transmitted voice and the received voice are outputted (S92). Thereafter, the muting process is terminated.

Meanwhile, when it is determined that the operation on the screen is not directed to canceling the mute setting (S91: No), the muting process is terminated without executing S92. Thereby, the mute setting is maintained.

Subsequently, referring to FIG. 17A, a transmitted voice volume control process to be executed by the CPU 11 of the MFP 1 will be described. FIG. 17A is a flowchart showing a transmitted voice volume control process. The transmitted voice control process is a process to be executed in the ear pressing process or the mouth pressing process as mentioned above. Specifically, the transmitted voice control process is adopted to control the sound volume of the transmitted voice when the finger is moved to conform to an operation method on the sound volume control area for the transmitted voice assigned to the ear area YB or the mouth area MB.

In the transmitted voice volume control process, firstly, based on the information stored on the RAM 13 in S42 in FIG. 14, the CPU 11 determines whether an operation manner on the sound volume control area for the transmitted voice conforms to the operation methods registered for turning up the sound volume (S102). More specifically, the CPU 11 determines that the operation manner on the sound volume control area for the transmitted voice is directed to turning up the sound volume when the operation manner is either the first method in which the finger in touch with the sound volume control area for the transmitted voice is moved from left to right or the second method in which the finger is moved from downside to upside (S102: Yes).

When it is determined in S102 that the operation manner on the sound volume control area for the transmitted voice conforms to the operation methods registered for turning up the sound volume (S102: Yes), the sound volume of the transmitted voice is turned up (S103), and the present process is terminated. The sound volume of the transmitted voice is stored onto the RAM 13 and reflected on a level indicated by the bar displayed on the right screen 16R of the LCD 16. It is noted that the same applies to a below-mentioned step S105.

Meanwhile, when it is determined that the operation manner on the sound volume control area for the transmitted voice does not conform to the operation methods registered for turning up the sound volume (S102: No), the CPU 11 determines based on the conditions shown in FIG. 3B whether the operation manner conforms to the operation methods registered for turning down the sound volume (S104). More specifically, as shown in FIG. 3B, the CPU 11 determines that the operation manner on the sound volume control area for the transmitted voice is directed to turning down the sound volume when the operation manner is either the first method in which the finger in touch with the sound volume control area for the transmitted voice is moved from right to left or the second method in which the finger is moved from upside to downside (S104: Yes).

When it is determined in S104 that the operation manner conforms to the operation methods registered for turning down the sound volume (S104: Yes), the sound volume of the transmitted voice is turned down (S105), and the present process is terminated.

Meanwhile, when it is determined in S104 that the operation manner does not conform to the operation methods registered for turning down the sound volume (S104: No), the current sound volume is maintained, and the present process is terminated.

Subsequently, referring to FIG. 17B, a received voice volume control process to be executed by the CPU 11 of the MFP 1 will be described. FIG. 17B is a flowchart showing a received voice volume control process. The received voice volume control process is a process to be executed in either the ear pressing process or the mouth pressing process. Specifically, the received voice volume control process is adopted to control the sound volume of the received voice when the finger is moved to conform to an operation method on the sound volume control area for the received voice assigned to the ear area YB or the mouth area MB.

In the received voice volume control process, firstly, based on the information stored on the RAM 13 in S42 in FIG. 14, the CPU 11 determines whether an operation manner on the sound volume control area for the received voice conforms to the operation methods registered for turning up the sound volume (S112). More specifically, the CPU 11 determines that the operation manner on the sound volume control area for the received voice is directed to turning down the sound volume when the operation manner is either the first method in which the finger in touch with the sound volume control area for the received voice is moved from left to right or the second method in which the finger is moved from downside to upside (S112: Yes).

When it is determined in S112 that the operation manner on the sound volume control area for the received voice conforms to the operation methods registered for turning up the sound volume (S112: Yes), the sound volume of the received voice is turned up (S113), and the received voice volume control process is terminated. The sound volume of the received voice is stored onto the RAM 13 and reflected on a level indicated by the bar displayed on the right screen 16R of the LCD 16. It is noted that the same applies to a below-mentioned step S115.

Meanwhile, when it is determined that the operation manner on the sound volume control area for the received voice does not conform to the operation methods registered for turning up the sound volume (S112: No), the CPU 11 determines based on the conditions shown in FIG. 3B whether the operation manner conforms to the operation methods registered for turning down the sound volume (S114). More specifically, as shown in FIG. 3B, the CPU 11 determines that the operation manner on the sound volume control area for the received voice is directed to turning down the sound volume when the operation manner is either the first method in which the finger in touch with the sound volume control area for the received voice is moved from right to left or the second method in which the finger is moved from upside to downside (S114: Yes).

When it is determined in S114 that the operation manner conforms to the operation methods registered for turning down the sound volume (S114: Yes), the sound volume of the received voice is turned down (S115), and the present process is terminated.

Meanwhile, when it is determined in S114 that the operation manner does not conform to the operation methods registered for turning down the sound volume (S114: No), the current sound volume is maintained, and the present process is terminated.

Hereinabove, according to the first embodiment, when the MFP 1 performs voice communication using the telephone function thereof with the external device 200, the sound volume control screen is displayed on the LCD 16. When a face image representing the intended party in the voice communication is displayed on the sound volume control screen, the ear area YB in the face image is assigned to the sound volume control area for the transmitted voice, and the mouth area MB in the face image is assigned to the sound volume control area for the received voice. When the user operates his finger in touch with the ear area YB in accordance with an operation method previously set, the sound volume of the transmitted voice is controlled. Additionally, when the user operates his finger in touch with the mouth area MB in accordance with an operation method previously set, the sound volume of the received voice is controlled. Thus, the user can easily associate a "sound uttered by the intended party" with the "received voice," and easily associate a "sound reaching the intended party" with the "transmitted voice." Hence, the user can intuitively control the sound volumes of the received voice and the received voice in the voice communication by using the face image representing the intended party.

In addition, when a face image representing the user is displayed on the sound volume control screen, the ear area YB in the face image is assigned to the sound volume control area for the received voice, and the mouth area MB in the face image is assigned to the sound volume control area for the transmitted voice. When the user operates his finger in touch with the ear area YB in accordance with an operation method previously set, the sound volume of the received voice is controlled. Additionally, when the user operates his finger in touch with the mouth area MB in accordance with an operation method previously set, the sound volume of the transmitted voice is controlled. Thus, the user can easily associate a "sound uttered by the intended party" with the "transmitted voice," and easily associate a "sound reaching an ear of the intended party" with the "received voice." Hence, the user can as well intuitively control the sound volumes of the received voice and the received voice in the voice communication by using the face image representing himself.

Thus, in the first embodiment, depending on a predetermined image such as a face image representing the intended party and the user, a predetermined area on the image is assigned to an area for controlling the sound volume of the received voice or the transmitted voice. Then, by specifying the area, the sound volume can be controlled. Therefore, the user can intuitively control the sound volume with the image.

Further, an operation method for controlling the sound volume is a method in which a finger in touch with the predetermined area is moved in the horizontal direction or the vertical direction. Hence, the user can control the sound volume with an intuitive operation.

Subsequently, referring to FIGS. 18 to 20, a FAX image control process to be executed by the CPU 11 of the MFP 1 in a second embodiment will be described. FIG. 18 is a flowchart showing a FAX image control process.

The FAX image control process is adopted to display an image control screen on the LCD 16 and adjust a FAX image depending on a finger operation on the image control screen. The FAX image control process is launched in response to the FAX image being displayed on the LCD 16 through a user operation of the operation keys 15.

In the FAX image control process, firstly, a FAX image is displayed with a thumbnail size on the right screen 16R of the LCD 16. Further, at the same time, a face image representing the user or a party other than the user as a sending source of the FAX image is displayed on the left screen 16L of the LCD 16 depending on whether the FAX image is an image to be transmitted or a received one (S151).

Next, the CPU 11 reads out the "controlled subjects," and the "coordinates of area," the "operation method," and a "current value" depending on each of the "controlled subjects" stored for the FAX sending source on the telephone directory memory 12c, and stores them onto the RAM 13 (S152). Thereby, an image control area is assigned to an area specified by the "coordinates of area" on the face image displayed on the image control screen depending on each of the "controlled subjects" (image scaling or image contrast adjustment). Further, the "operation method" specifies operation manners in which the finger is operated to achieve an intended image control on the area. Additionally, the "current value" specifies an adjustment amount (a scaling ratio or a contrast adjustment amount) per unit length of a moving distance of the finger in touch with the area.

After S152, the CPU 11 determines whether the touch panel 17 has been touched (S154). When determining that the touch panel 17 has been touched (S154: Yes), the CPU 11 determines whether an area touched is the right eye area RB (S155).

When it is determined that the area touched is the right eye area RB (S155: Yes), a below-mentioned right eye pressing process (see FIG. 19) is performed (S156), and the present process goes to S157. Thereby, the image adjustment for the FAX image (enlargement or reduction of the FAX image) is performed depending on the image control area and the operation methods assigned to the right area RB.

Meanwhile, when it is determined that the area touched is not the right eye area RB (S155: No), the present process goes to S157 without executing the step S157.

In S157, the CPU 11 determines whether the area touched in S154 is the left eye area LB (S157). When it is determined that the area touched is the left eye area LB (S157: Yes), a below-mentioned left eye pressing process (see FIG. 20) is performed (S158), and the present process goes to S159. Thereby, the image adjustment for the FAX image (contrast adjustment for the FAX image) is performed depending on the image control area and the operation methods assigned to the left area LB.

Meanwhile, in S157, When it is determined that the area touched is not the left eye area LB (S157: No), the present process goes to S159 without involving the step S158.

Additionally, when it is determined that the touch panel 17 has not been touched (S154: No), the present process goes to S159.

In S159, the CPU 11 determines whether an end key which is part of the operation keys 15 has been pressed (S159). When it is determined that the end key has not been pressed (S159: No), the present process goes back to S154, and the steps S154 to 159 are re-executed.

Meanwhile, when it is determined that the end key has been pressed (S159: Yes), FAX data rewritten with an image size and contrast adjusted using the right eye area RB and the left eye area LB on the face image representing the user is stored onto the RAM 13 (S160), and the FAX image control process is terminated.

Subsequently, with reference to FIG. 19, the aforementioned right eye pressing process (S156) will be described.

FIG. 19 is a flowchart showing a right eye pressing process (S156) to be executed in the FAX image control process shown in FIG. 18.

In the right eye pressing process (S156), firstly, based on the information stored on the RAM 13 in S152 shown in FIG. 18, the CPU 11 determines whether an operation manner on the right eye area RB conforms to the operation methods registered for enlarging the FAX image (S202). Specifically, based on the conditions shown in FIG. 3B, the CPU 11 determines that the operation manner on the right eye area RB conforms to the operation methods registered for enlarging the FAX image (S202: Yes) when the finger in touch with the image control area (the right eye area RB) is moved from left to right in the first method or the finger in touch with the right eye area RB is moved from upside to downside in the second method.

When it is determined in S202 that the operation manner on the right eye area RB conforms to the operation methods registered for enlarging the FAX image (S202: Yes), the FAX image is enlarged depending on a moving distance of the finger (S203). Thereafter, the right eye pressing process (S156) is terminated.

Meanwhile, when it is determined that the operation manner on the right eye area RB does not conform to the operation methods registered for enlarging the FAX image (S202: No), the CPU 11 determines whether the operation manner on the right eye area RB conforms to the operation methods registered for reducing the FAX image (S204). Specifically, based on the conditions shown in FIG. 3B, the CPU 11 determines that the operation manner on the right eye area RB conforms to the operation methods registered for reducing the FAX image (S204: Yes) when the finger in touch with the image control area (the right eye area RB) is moved from right to left in the first method or the finger in touch with the right eye area RB is moved from downside to upside in the second method. When it is determined in S204 that the operation manner on the right eye area RB conforms to the operation methods registered for reducing the FAX image (S204: Yes), the FAX image is reduced depending on a moving distance of the finger (S205). Thereafter, the right eye pressing process (S156) is terminated.

Meanwhile, when it is determined in S204 that the operation manner on the right eye area RB does not conform to the operation methods registered for reducing the FAX image (S204: No), the current state of the FAX image is maintained, and the right eye pressing process (S156) is terminated.

Subsequently, with reference to FIG. 20, the aforementioned left eye pressing process (S158) will be described. FIG. 20 is a flowchart showing a left eye pressing process (S158) to be executed in the FAX image control process shown in FIG. 18.

In the left eye pressing process (S158), firstly, based on the information stored on the RAM 13 in S152 shown in FIG. 18, the CPU 11 determines whether the "controlled subject" is contrast adjustment (S231). When determining that the "controlled subject" is contrast adjustment (S231: Yes), the CPU 11 determines in S232 whether an operation manner on the left eye area LB conforms to operation methods registered for increasing the contrast of the FAX image (S232). Specifically, the CPU 11 determines that the operation manner on the left eye area LB conforms to the operation methods registered for increasing the contrast of the FAX image (S232: Yes) when the finger in touch with the image control area (the left eye area LB) is moved from left to right or the finger in touch with the left eye area LB is moved from upside to downside.

When it is determined in S232 that the operation manner on the left eye area LB conforms to the operation methods registered for increasing the contrast of the FAX image (S232: Yes), the contrast of the FAX image is increased depending on a moving distance of the finger (S233). Thereafter, the left eye pressing process (S158) is terminated.

Meanwhile, when it is determined that the operation manner on the left eye area LB does not conform to the operation methods registered for increasing the contrast of the FAX image (S232: No), the CPU 11 determines whether the operation manner on the left eye area LB conforms to the operation methods registered for decreasing the contrast of the FAX image (S234). Specifically, the CPU 11 determines that the operation manner on the left eye area LB conforms to the operation methods registered for decreasing the contrast of the FAX image (S234: Yes) when the finger in touch with the image control area (the left eye area LB) is moved from right to left or the finger in touch with the left eye area LB is moved from downside to upside. When it is determined in S234 that the operation manner on the left eye area LB conforms to the operation methods registered for decreasing the contrast of the FAX image (S234: Yes), the contrast of the FAX image is decreased depending on a moving distance of the finger (S235). Thereafter, the left eye pressing process (S158) is terminated.

Meanwhile, when it is determined in S234 that the operation manner on the left eye area LB does not conform to the operation methods registered for decreasing the contrast of the FAX image (S234: No), the current state of the FAX image is maintained, and the left eye pressing process (S158) is terminated.

On the contrary, when determining that the "controlled subject" is not contrast adjustment (S231: No), the CPU 11 determines whether the operation manner on the left eye area LB conforms to the operation method registered for scrolling the FAX image (S236). Then, when it is determined that the operation manner on the left eye area LB conforms to the operation methods registered for scrolling the FAX image (S236: Yes), the FAX image is scrolled depending on a moving distance of the finger (S237). Thereafter, the left eye pressing process (S158) is terminated.

Meanwhile, when it is determined that the operation manner on the left eye area LB does not conform to the operation methods registered for scrolling the FAX image (S236: No), the left eye pressing process (S158) is terminated.

Hereinabove, according to the FAX image control process shown in FIGS. 18, 19, and 20, the display condition of the FAX image can be adjusted as needed by using the face image displayed on the image control screen. Therefore, the user can adjust the FAX image, through an intuitive operation on the face image displayed on the image control area, into a state where the user feels like the FAX image can easily be viewed.

Further, according to the second embodiment, it is possible to adjust the FAX image depending on a moving distance of the finger in touch with an area (in the second embodiment, the right eye area RB or the left eye area LB), which is assigned for image adjustment, in the face image displayed on the image control screen of the touch panel 17. Thus, depending on a displacement of an externally specified position on the area assigned for image adjustment, it is possible to adjust an image to be controlled. Hence, the user can intuitively specify a desired adjustment amount (an increasing or decreasing amount of a parameter) when adjusting the image to be controlled.

Further, according to the second embodiment, the right eye and the left eye in the face image are assigned to the areas for controlling the FAX image. The eyes are regions that make the user associate them with visual things. Therefore, it is easy to make the user associate the "eyes" in the face image with image adjustment for the FAX image to be controlled. Hence, using the face image, the user can intuitively control the FAX image (namely, adjust the display condition of the FAX image) received or to be transmitted in communication with the external device 200.

Further, according to the second embodiment, the "right eye" and the "left eye" in the face image are assigned to areas for respective different image adjustments such as scaling the FAX image and scrolling the FAX image. Thus, mutually related regions in the face image can be assigned to the areas for the image adjustments, and the respective different image adjustments can be achieved on the regions. Therefore, the user can intuitively grasp the areas on which the respective different image adjustments can be achieved.

Next, referring to FIG. 21, a third embodiment will be described. The explanation of the first embodiment is directed to the sound volume control for the transmitted voice and the received voice in the voice communication using the telephone function of the MFP 1. The third embodiment is adopted such that, when a PC 400 communicates with an external device 200 via an MFP 300 and the telephone line network 100, a sound volume of a transmitted voice and a received voice can intuitively be controlled on a sound volume control screen to be displayed on an LCD 416 connected with the PC 400 depending on the intended party of the voice communication. It is noted that the same elements of the third embodiment as those of the first embodiment will be provided with the same reference characters, and explanations thereof will be omitted.

FIG. 21 is a block diagram showing an electrical configuration of a sound volume control system T in the third embodiment. The sound volume control system T is configured with the MFP 300 and the PC 400.

The MFP 300 of the third embodiment is different from the MFP 1 of the first embodiment in that an EEPROM 312 is provided as substitute for the EEPROM 12 and that an interface 331 is provided.

The EEPROM 312 is a non-volatile memory configured to store control programs 312a to be executed by the CPU 11 and constant values in a rewritable manner and keep them stored even after the MFP 300 is powered OFF. The control programs 312a contains a program adopted to establish connection between the PC 400 and the external device 200 linked with the telephone line network 100 via the interface 331, the I/O port 27, and the NCU 23 and to control voice communication between the PC 400 and the external device 200. When the PC 400 issues, to the MFP 300, an instruction to begin the voice communication with the external device 200, the CPU 11 executes the program. Thereby, the voice communication between the PC 400 and the external device 200 is achieved.

The interface 331 is configured to establish connection between the MFP 300 and the PC 400 and achieve data communication therebetween. The interface 331 is connected with each element provided to the MFP 1 via the I/O port 27.

Meanwhile, the PC 400 includes a CPU 411, a ROM 412, a RAM 413, a Hard Disk Drive (HDD) 414, a timer circuit 415, an interface 420. The COU 411, the ROM 412, and the RAM 413 are interconnected via a bus line 421. In addition, the HDD 414, the timer circuit 415, the interface 420, and the bus line 421 are interconnected via an Input/Output (I/O) port 422.

Further, the I/O port 422 is joined with an LCD 416, a touch pen 417, a microphone 418, and a speaker 419. Thereby, data communication is achieved between the PC 400 and those elements.

The CPU 411 is configured to control operation of the PC 400 in accordance with a program stored on the ROM 412 or the HDD 414, or a control signal from each element connected with the I/O port 422.

The ROM 412 is a non-rewritable non-volatile memory adopted to store various control programs to be executed by the CPU 411 and constant values. The RAM 413 is a rewritable volatile memory adopted to temporarily store various data in executing each operation of the PC 400.

The HDD 414 is a rewritable non-volatile memory including control programs 414a, an image memory 414b, and a telephone directory memory 414c.

The control programs 414a contain a voice communication processing program for achieving voice communication with the external device 200 joined with the telephone line network 100 via the MFP 300. When launching the voice communication processing program based on an instruction from the user, the CPU 411 issues an instruction to begin voice communication to the MFP 300. Thereby, the voice communication is established between the PC 400 and the external device 200.

Further, the control programs 414a contain the same programs as the flowcharts shown in FIGS. 12 to 17B. In addition, the image memory 414b and the telephone directory memory 414c are the same as the image memory 12b and the telephone directory memory 12c included in the EEPROM 12 of the MFP 1, respectively.

Therefore, when the CPU 411 executes the program according to the flowchart shown in FIG. 12, it is possible to register an image to be displayed on the sound volume control screen, and the sound volume control areas for the transmitted voice and the received voice and the mute setting area on the face image. Further, when the CPU 411 executes the programs according to the flowcharts shown in FIGS. 13 to 17B, the LCD 416 displays the sound volume control screen as illustrated in FIG. 3A or 5 at the time of the voice communication between the PC 400 and the external device 200. Thereby, it is possible for the user to intuitively control the sound volume of the received voice outputted from the speaker 419 or the transmitted voice to be sent to the external device 200.

The timer circuit 415 is a known circuit with a clock function that provides a current date and time. The interface 420 is adopted to establish connection between the PC 400 and the MFP 300 and to achieve data communication of various kinds of data therebetween.

The LCD 416 is a display device provided with an LCD panel (not shown) and configured to display on the LCD panel a menu or an operational state in accordance with an operation of the touch pen 417. The LCD 416 displays the sound volume control screen to be displayed at the time of the voice communication between the PC 400 and the external device 200.

The touch pen 417 is an input device configured to detect coordinates of a point touched thereby on the LCD panel of the LCD 416 and to transmit the detected coordinates to the PC 400. The CPU 411 is adopted to determine, based on the coordinates detected on the touch panel 417, what kind of operation is performed on the sound volume control area for the transmitted voice, the sound volume control area for the received voice, or the mute setting area on the sound volume control screen displayed on the LCD 416. When it is determined that the operation performed conforms to operation methods registered for each of the areas, it is possible to control the transmitted voice or the received voice, or to configure or cancel the mute setting depending on the operation.

The microphone 418 is an input device configured to convert a voice of the user into sound data. The sound data converted through the microphone 418 is sent to the external device 200 as the transmitted voice. The sound volume of the transmitted voice to be sent to the external device 200 is intuitively controlled on the sound volume control screen.

The speaker 419 is an output device configured to output sound data received from the external device 200 outside as the received voice. The sound volume of the received voice received from the external device 200 is intuitively controlled on the sound volume control screen.

Hereinabove, according to the third embodiment, in the same manner as the first embodiment, depending on a predetermined image displayed on the sound volume control screen, a predetermined area on the image is assigned to an area for sound volume control. Then, an intended sound volume is controlled by specifying the predetermined area. Therefore, the user can intuitively control the intended sound volume using the specified area.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

In the first and third embodiments, the transmitted voice and the received voice are controlled on the sound volume control screen at the time of the voice communication with the external device 200. However, sound volumes of various kinds of sounds may be controlled on the sound volume control screen according to aspects of the present invention. For example, when a sound volume of a sound outputted from a speaker of an audio system is controlled by a remote controller provided with an LCD having a touch panel, the remote controller may be configured to display on the LCD an image including a sliding volume controller and to control the sound volume by touching and operating the sliding volume controller. Thus, when what is displayed on the sound volume control screen is an image reminding of a subject of which a sound volume is to be controlled, the user can achieve sound volume control more intuitively.

In the first and third embodiments, when the sound volume control area for the transmitted voice or the received voice is touched, the current sound volume of the transmitted voice or the received voice to be controlled on the sound volume control area is shown with a bar as an indicator. Further, when the transmitted voice or the received voice is controlled by a finger operation, the sound volume controlled is indicated using the bar. However, as illustrated in FIG. 22A, the sound volume to be controlled may be associated with a size of an ear displayed on the sound volume control screen. Then, when the transmitted voice or the received voice is controlled through a finger operation on the ear area YB, the size of the ear displayed on the sound volume control screen may vary depending on the sound volume controlled. Further, in the same manner, a size of a mouth may be associated with a sound volume. Additionally, when the mute setting is configured through a finger operation on the sound volume control screen, as shown in FIG. 22B, an image of a fastener may be shown in the mouth area MB. Thereby, the user can intuitively grasp the change of the sound volume or the state of the mute setting after the finger operation.

In the first and third embodiments, an operation on the sound volume control area for the transmitted voice or the received voice is achieved by touching the touch panel 17 with a finger. However, the sound volume control area for the transmitted voice or the received voice may be operated by touching the touch panel 17 with a pointer. Moreover, the sound volume control area for the transmitted voice or the received voice may be operated by putting the pointer close to the touch panel 17. It is noted that aspects of the present invention may be adopted to control only the transmitted voice and the received voice. Furthermore, aspects of the present invention may be adopted to achieve only the image adjustment.

What is claimed is:

1. An output control device, comprising:
    an output unit configured to output information externally received by the output control device or to be transmitted from the output control device;
    a display unit configured to display a predetermined image comprising a plurality of regions;
    a position detecting unit configured to detect a position specified on the predetermined image displayed on the display unit;
    a display control unit configured to control the display unit to display the predetermined image when the output unit outputs the information;
    an area allocating unit configured to:
        when the display control unit controls the display unit to display a first image representing an external party in communication with the output control device, allocate an area corresponding to a predetermined region of the first image to an output control area for controlling an output condition of a first type of information to be output by the output unit, and
        when the display control unit controls the display unit to display a second image representing a user who performs communication by operating the output control device, allocate an area corresponding to a same region of the second image as the predetermined region of the first image to an output control area for controlling an output condition of a second type of information to be output by the output unit that is different from the first type of information; and
    an output control unit configured to control the output condition of the information corresponding to the allocated output control area when the specified position on the predetermined image detected by the position detecting unit is within the output control area allocated by the area allocating unit.

2. The output control device according to claim 1, further comprising a displacement detecting unit configured to detect a displacement of the specified position on the predetermined image,
    wherein the output control unit is configured to, when the displacement of the specified position on the predetermined image detected by the displacement detecting unit is a displacement satisfying a predetermined condition on the output control area allocated by the area allocating unit, control the output condition of the information to be outputted from the output unit depending on the displacement.

3. The output control device according to claim 1, further comprising:
    an area setting unit configured to set, on the predetermined image displayed on the display unit, the output control area allocated by the area allocating unit, based on an external instruction; and
    a storage configured to store positional data regarding the output control area set by the area setting unit.

4. The output control device according to claim 2, further comprising:
    an area setting unit configured to set, on the predetermined image displayed on the display unit, the output control area allocated by the area allocating unit, based on an external instruction;
    a condition setting unit configured to set the predetermined condition for the displacement of the specified position on the predetermined image, based on an external instruction; and
    a storage configured to store positional data regarding the output control area set by the area setting unit and the predetermined condition set by the condition setting unit.

5. The output control device according to claim 1,
    wherein the display unit includes a display panel, the display panel having the position detecting unit,
    wherein the position detecting unit includes a touch panel configured to recognize a position thereon touched by or close to a pointer as the specified position,
    wherein the display control unit is configured to control the display panel to display the predetermined image when the output unit outputs the information, and
    wherein the area allocating unit is configured to allocate the output control area on the predetermined image displayed on the display panel with coordinates defined on the touch panel.

6. The output control device according to claim 1, further comprising a communication unit configured to perform communication with an external device therethrough,
    wherein the output unit is configured to output, as the information, a voice received from the external device via the communication unit and a voice to be transmitted outside via the communication unit.

7. The output control device according to claim 6,
    wherein the display control unit is configured to control the display unit to display a predetermined image corresponding to an intended party in the communication via the communication unit,
    wherein the area allocating unit is configured to allocate a first area on the predetermined image corresponding to the intended party as an output control area for the received voice to be outputted from the output unit and to specify a second area on the predetermined image corresponding to the intended party as an output control area for the transmitted voice to be outputted from the output unit, and
    wherein the output control unit is configured to control an output condition of the received voice when a position detected by the position detecting unit on the predetermined image corresponding to the intended party is the first area and to control an output condition of the transmitted voice when a position detected on the predetermined image corresponding to the intended party is the second area.

8. The output control device according to claim 1, further comprising a communication unit configured to perform communication with an external device therethrough,
wherein the display control unit is configured to, when image data is received from the external device via the communication unit, control the display unit to display an image based on the image data received,
wherein the output control unit is configured to control an output condition of the image based on the received image data that is displayed on the display unit, and
wherein the output unit is configured to display or print the image of which the output condition is controlled by the output control unit.

9. The output control device according to claim 1, further comprising a communication unit configured to perform communication with an external device therethrough,
wherein the display control unit is configured to control the display unit to display an image based on image data to be transmitted outside via the communication unit,
wherein the output control unit is configured to control an output condition of the image based on the image data to be transmitted outside that is displayed on the display unit, and
wherein the output unit is configured to transmit outside, via the communication unit, the image data of which the output condition is controlled by the output control unit.

10. The output control device according to claim 8,
wherein the display unit includes a substantially rectangular display area, the display area having a first side, a second side shorter than the first side, and first and second areas aligned along the first side,
wherein the display control unit is configured to, when image data is received from the external device via the communication unit, control the display unit to display a predetermined image corresponding to the external device in the first area, and display the image based on the image data received from the external device in the second area as a subject to be controlled.

11. The output control device according to claim 9,
wherein the display unit includes a substantially rectangular display area, the display area having a first side, a second side shorter than the first side, and first and second areas aligned along the first side,
wherein the display control unit is configured to, when there is image data to be transmitted outside via the communication unit, control the display unit to display a predetermined image corresponding to the output control device in the first area, and display an image based on the image data to be transmitted outside in the second area as a subject to be controlled.

12. An output control device, comprising:
a communication unit configured to perform communication with an external device therethrough;
an output unit configured to output a voice received from the external device and a voice to be transmitted from the output control device;
a display unit configured to display a predetermined image comprising a plurality of regions;
a position detecting unit configured to detect a position specified on the predetermined image displayed on the display unit;
a display control unit configured to control the display unit to display the predetermined image when the communication is performed with the external device via the communication unit;
an area allocating unit configured to:
when the display control unit controls the display unit to display a first image representing an external party in communication with the output control device, allocate an area corresponding to a predetermined region of the first image to an output control area for controlling an output condition of the voice received from the external device, and
when the display control unit controls the display unit to display a second image representing a user who performs communication by operating the output control device, allocate an area corresponding to a same region of the second image as the predetermined region of the first image to an output control area for controlling an output condition of the voice to be transmitted from the output control device; and
an output control unit configured to control the output condition of the voice received from the external device and the voice to be transmitted from the output control device corresponding to the respective allocated output control areas, when the specified position detected on the predetermined image by the position detecting unit is within the output control area allocated by the area allocating unit.

13. The output control device according to claim 12,
wherein the display control unit is configured to, when the specified position detected on the first image by the position detecting unit is within the output control area allocated by the area allocating unit, control the display unit to display the sound volume of the received voice to be outputted by the output unit along with the first image, and
wherein the display control unit is configured to, when the specified position detected on the second image by the position detecting unit is within the output control area allocated by the area allocating unit, control the display unit to display the sound volume of the transmitted voice to be outputted by the output unit along with the second image.

14. A computer readable medium comprising computer readable instructions to be executed by an output control device that includes an output unit configured to output information externally received by the output control device or to be transmitted from the output control device, a display unit configured to display a predetermined image comprising a plurality of regions, and a position detecting unit configured to detect a position specified on the predetermined image displayed on the display unit, the instructions causing the output control device to perform:
a display control step of controlling the display unit to display the predetermined image when the output unit outputs the information;
an area allocating step of:
when the display unit displays a first image representing an external party in communication with the output control device, allocate an area corresponding to a predetermined region of the first image to an output control area for controlling an output condition of a first type of information to be output by the output unit, and
when the display unit displays a second image representing a user who performs communication by operating the output control device, allocate an area corresponding to a same region of the second image as the predetermined region of the first image to an output control area for controlling an output condition of a second type of information to be output by the output unit that is different from the first type of information, and an output control step of controlling the output condition of the information corresponding to the allocated output control area, when the specified position on the predetermined image detected by the position detecting unit is within the output control area allocated in the area specifying step.

15. An output control system, comprising:

an output unit configured to output information externally received by the output control system or to be transmitted from the output control system;

a display unit configured to display a predetermined image comprising a plurality of regions;

a position detecting unit configured to detect a position specified on the predetermined image displayed on the display unit;

a display control unit configured to control the display unit to display the predetermined image when the output unit outputs the information;

an area allocating unit configured to:
 when the display control unit controls the display unit to display a first image representing an external party in communication with the output control device, allocate an area corresponding to a predetermined region of the first image to an output control area for controlling an output condition of a first type of information to be output by the output unit, and
 when the display control unit controls the display unit to display a second image representing a user who performs communication by operating the output control device, allocate an area corresponding to a same region of the second image as the predetermined region of the first image to an output control area for controlling an output condition of a second type of information to be output by the output unit that is different from the first type of information; and an output control unit configured to control the output condition of the information corresponding to the allocated output control area, when the specified position on the predetermined image detected by the position detecting unit is within the output control area allocated by the area allocating unit.

16. The output control device according to claim 1,
wherein the display control unit is configured to control the display unit to display one of a face image representing the external party in voice communication via the output control device and a face image representing the user performing the voice communication by operating the output control device, and
wherein the area allocating unit is configured to:
 when the display unit displays the face image representing the external party in voice communication via the output control device, allocate an area corresponding to an ear of the face image representing the external party to an output control area for controlling a sound volume of a voice to be transmitted to the external party from the output control device, and
 when the display unit displays the face image representing the user who performs communication by operating the output control device, allocate an area corresponding to an ear of the face image representing the user to an output control area for controlling a sound volume of a voice received from the external party by the output control device.

17. The output control device according to claim 1,
wherein the display control unit is configured to control the display unit to display one of a face image representing the external party in voice communication via the output control device and a face image representing the user performing the voice communication by operating the output control device, and
wherein the area allocating unit is configured to:
 when the display unit displays the face image representing the external party in voice communication via the output control device, allocate an area corresponding to a mouth of the face image representing the external party to an output control area for controlling a sound volume of a voice received from the external party by the output control device, and
 when the display unit displays the face image representing the user who performs communication by operating the output control device, allocate an area corresponding to a mouth of the face image representing the user to an output control area for controlling a sound volume of a voice to be transmitted to the external party from the output control device.

18. The output control device according to claim 1,
wherein the display control unit is configured to control the display unit to:
 display one of a face image representing the external party in voice communication via the output control device and a face image representing the user performing the voice communication by operating the output control device, and
 display one of an image representing image data received from the external party by the output control device and an image representing image data to be transmitted to the external party from the output control device, and
wherein the area allocating unit is configured to:
 when the display unit displays the face image representing the external party in voice communication via the output control device, allocate an area corresponding to an eye of the face image representing the external party to an output control area for controlling a display condition of the image representing the image data received from the external party by the output control device, and
 when the display unit displays the face image representing the user who performs communication by operating the output control device, allocate an area corresponding to an eye of the face image representing the user to an output control area for controlling a display condition of the image data to be transmitted to the external party from the output control device.

19. The output control device of claim 18,
wherein the area allocating unit is configured to:
 allocate an area corresponding to a left eye of a displayed face image representing one of the external party and the user, to an output control area for controlling a first type of display condition of a displayed image representing one of the image data received from the external party and the image data to be transmitted to the external party,
 allocate an area corresponding to a right eye of the displayed face image to an output control area for controlling a second type of display condition of the displayed image that is different from the first type of display condition.

* * * * *